United States Patent
Shinkai et al.

(10) Patent No.: US 8,246,188 B2
(45) Date of Patent: Aug. 21, 2012

(54) ILLUMINATING DEVICE AND DISPLAY UNIT

(75) Inventors: Shogo Shinkai, Miyagi (JP); Shigehiro Yamakita, Miyagi (JP); Hirokazu Odagiri, Miyagi (JP); Yasuyuki Kudo, Miyagi (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 12/669,396

(22) PCT Filed: May 20, 2009

(86) PCT No.: PCT/JP2009/059247
§ 371 (c)(1),
(2), (4) Date: Jan. 15, 2010

(87) PCT Pub. No.: WO2009/142226
PCT Pub. Date: Nov. 26, 2009

(65) Prior Publication Data
US 2010/0195314 A1 Aug. 5, 2010

(30) Foreign Application Priority Data
May 23, 2008 (JP) .................................. 2008-135803

(51) Int. Cl.
*F21V 5/02* (2006.01)
(52) U.S. Cl. .................... 362/97.2; 362/330; 362/339
(58) Field of Classification Search ............. 362/97.1, 362/97.2, 330, 339, 619, 620; 349/63, 64
See application file for complete search history.

(56) References Cited

U.S. PATENT DOCUMENTS

| 6,333,817 | B1 | 12/2001 | Kashima et al. | |
| 7,705,930 | B2 * | 4/2010 | Imajo et al. | 349/64 |
| 7,806,567 | B2 * | 10/2010 | Chen | 362/311.06 |
| 7,841,749 | B2 * | 11/2010 | Kim et al. | 362/332 |

(Continued)

FOREIGN PATENT DOCUMENTS

JP   09-236803   9/1997

(Continued)

OTHER PUBLICATIONS

EP Search Report for corresponding 09750588.7 dated May 19, 2011; 3 pages.

(Continued)

*Primary Examiner* — Peggy A. Neils
(74) *Attorney, Agent, or Firm* — K&L Gates LLP

(57) ABSTRACT

An illuminating device capable of decreasing not only in-plane luminance unevenness in the front face direction but also in-plane luminance unevenness when viewed from a diagonal direction is provided. Where an occupancy ratio of a return light generation section in which light from respective linear light sources vertically entering a light incident surface of an optical sheet is entirely reflected by a surface of a convex section and return light oriented toward a reflecting plate is generated out of a first region R1 when the optical sheet is viewed from the normal line direction of a face is K1; and where an occupancy ratio of a return light generation section in which light from the respective linear light sources vertically entering the light incident surface of the optical sheet is entirely reflected by a surface of convex sections and return light oriented toward the reflecting plate is generated out of a second region when the optical sheet is viewed from the normal line direction of the face is K2, and K1 is larger than K2.

28 Claims, 19 Drawing Sheets

U.S. PATENT DOCUMENTS

| | | | |
|---|---|---|---|
| 8,118,469 B2 * | 2/2012 | Shinkai et al. | 362/620 |
| 2005/0243551 A1 | 11/2005 | Onishi et al. | |
| 2007/0047258 A1 * | 3/2007 | Yao et al. | 362/615 |
| 2007/0058359 A1 * | 3/2007 | Saitoh et al. | 362/97 |
| 2007/0110386 A1 | 5/2007 | Chiang | |
| 2008/0002098 A1 | 1/2008 | Imajo et al. | |
| 2008/0068716 A1 | 3/2008 | Goto | |

FOREIGN PATENT DOCUMENTS

| | | |
|---|---|---|
| WO | 2006/071616 | 7/2006 |

OTHER PUBLICATIONS

International Search Report dated Aug. 12, 2009, for corresponding Patent Application PCT/JP2009/059247.

* cited by examiner

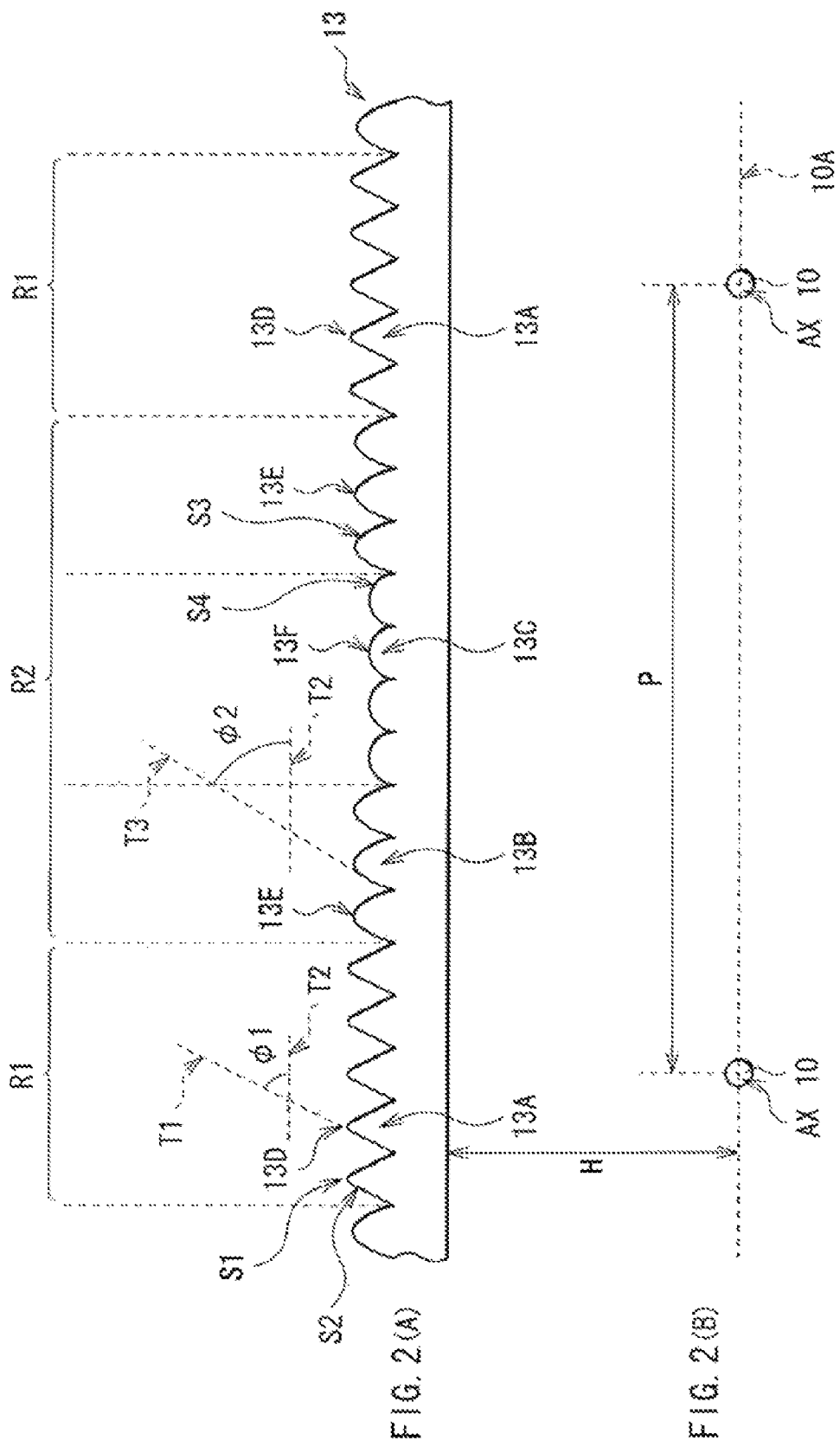

ILLUMINATING DEVICE AND DISPLAY UNIT

CROSS REFERENCE TO RELATED APPLICATIONS

The present application is a National Stage of International Application No. PCT/JP2009/059247 filed on May 20, 2009 and which claims priority to Japanese Patent Application No. 2008-135803 filed on May 23, 2008, the entire contents of which are being incorporated herein by reference.

BACKGROUND

The present disclosure relates to an illuminating device illuminating, for example, a transmissive liquid crystal panel from behind and a display unit including the same.

In the past, as a display unit of a word processor, a laptop personal computer or the like, a liquid crystal display unit in which a backlight (illuminating device) is arranged behind a liquid crystal panel has been used. As the illuminating device for the liquid crystal display unit, for the purpose of realizing a light-weight and thin body, an edge light type illuminating device in which a linear light source such as a fluorescent lamp is arranged on the side edge section of a light guide plate and a liquid crystal panel is arranged over the light guide plate has been mainstream. However, as the display unit has grown in size for the use of a television or the like in recent years, it is often the case that the luminance is not sufficient in the foregoing edge light type illuminating device. Thus, in recent years, a direct type illuminating device in which a linear light source is arranged directly beneath the liquid crystal panel has been used. (Patent Document 1)

[Prior Art Document]
Patent document
Patent Document 1 WO2006/071616

As display units have grown in size and have been thinned, illuminating devices have grown in size and have been thinned, as well. In result, there is a tendency that the number of linear light sources used for the illuminating device is increased, and a clearance between a tabular optical device arranged directly above the linear light sources and the linear light sources becomes narrow. If the number of linear light sources is increased, electric power consumption of the illuminating device is increased and electric power consumption of the television is also increased. Thus, it is conceivable that the number of linear light sources is not increased as much as possible, that is, a clearance between adjacent linear light sources is increased and thereby the increase amount of electric power consumption is inhibited. However, in this case, there are issues that in-plane luminance of illuminating light beam of the illuminating device becomes high in the position directly above the linear light sources, becomes low in the position directly above the central section between the linear light sources, and luminance unevenness is generated in a plane. Further, in the case where the clearance between the tabular optical device arranged directly above the linear light sources and the linear light sources is narrowed, again, there is a problem that luminance unevenness is generated in a plane.

Thus, a measure that a plurality of nonspherical convex sections in the same shape are provided in a plane on the light emission side of a diffusion plate formed by dispersing a diffusion material (filler) therein has been proposed. Thereby, not only the diffusion effect by the filler, but also diffusion effect of light directly above the linear light sources by the nonspherical shape is obtained, and accordingly the luminance unevenness is able to be resolved. However, such effect is limited, and widening the clearance between adjacent linear light sources or narrowing the clearance between the linear light sources and the optical device is not able to be realized much. Thus, it is further conceivable that a convex section is in the shape of a prism in the position directly above the central section between linear light sources, and thereby the front luminance in the position directly above the central section between the linear light sources is increased. However, in this case, there is a problem that though in-plane luminance unevenness when viewed from the front face is able to be resolved, in-plane luminance unevenness when viewed from a diagonal direction is deteriorated.

It is therefore desirable to provide an illuminating device with which not only in-plane luminance unevenness when viewed from the front face direction, but also in-plane luminance unevenness when viewed from a diagonal direction is able to be decreased and a display unit.

SUMMARY

An illuminating device of an embodiment comprises: a plurality of linear light sources arranged so that respective central axes are in parallel with each other and are included in one plane; a reflecting plate arranged oppositely to the respective linear light sources; a tabular diffusion member arranged on the side opposite to the reflecting plate with respect to the one face; and an optical member arranged between the respective linear light sources and the diffusion member. Here, the optical member has a light incident surface in parallel with the one face, and a light emission surface. In the light emission surface, a first three dimensional structure is provided in a first region opposed to the respective linear light sources in a normal line direction of the one face, and a second three dimensional structure is provided in a second region opposed to an intermediate region between one linear light source and another linear light source adjacent to the one linear light source in the normal line direction of the one face. Where an occupancy ratio of a first section in which light from the respective linear light sources vertically entering the light incident surface is entirely reflected by the first three dimensional structure and return light oriented toward the reflecting plate is generated out of the first region when the optical member is viewed from the normal line direction of the one face is K1; and where an occupancy ratio of a second section in which light from the respective linear light sources vertically entering the light incident surface is entirely reflected by the second three dimensional structure and return light oriented toward the reflecting plate is generated out of the second region when the optical member is viewed from the normal line direction of the one face is K2,
K1 and K2 satisfy the following formula.

$$K1-K2>0$$

The display unit of the embodiment comprises a panel driven based on an image signal and the illuminating device illuminating the panel.

In the illuminating device and the display unit of the embodiment, K1 is larger than K2 in the optical member. That is, the first region located directly above the respective linear light sources more hardly transmits light than the second region sandwiched between the first regions. Thus, return light from the first region is, for example, reflected by the reflecting sheet or the like, and is cycled in the illuminating device. After that, much of the cycled light is transmitted through the second region that easily transmits light relatively. Thereby, if the light amount distribution of light entering the optical member is compared to the light amount distribution of light transmitted through the optical member, light amount is shifted from the first region to the second region. Further, the second region transmits light more easily than the first region. Thus, in the second region, the light collection characteristics are weak, and the diffusion characteristics are strong. Thereby, the light amount of light transmitted through the second region is distributed not only in the front face direction but also is widely distributed in diagonal directions.

According to the illuminating device and the display unit of the embodiment, K1 is larger than K2 in the optical member. Thus, light amount is able to be shifted from the first region to the second region. Further, the light amount of light transmitted through the second region is able to be distributed not only in the front face direction but also widely distributed in diagonal directions. Thereby, not only in-plane luminance unevenness in the front face direction but also in-plane luminance unevenness when viewed from a diagonal direction is able to be decreased.

Additional features and advantages are described herein, and will be apparent from, the following Detailed Description and the figures.

BRIEF DESCRIPTION OF THE FIGURES

FIG. 2 is a cross sectional structure view of an example of the optical sheet of FIG. 1;

DETAILED DESCRIPTION

A description will be hereinafter given in detail of an embodiment with reference to the drawings.

Figure 1:
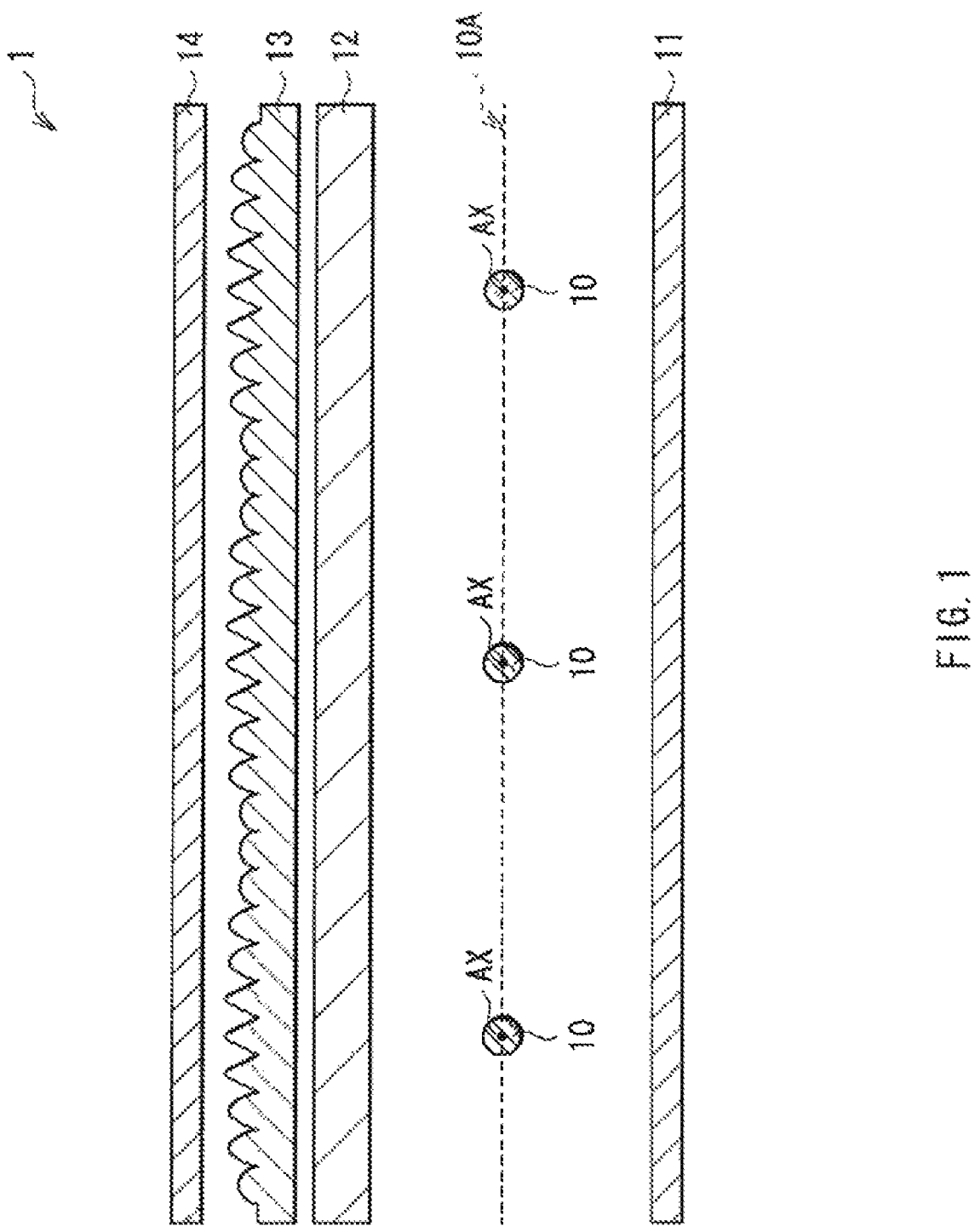
FIG. 1 is a cross sectional structure view of an example of an illuminating device according to an embodiment.

FIG. 1 illustrates a cross sectional structure of an illuminating device 1 according to an embodiment.

The illuminating device 1 includes a plurality of linear light sources 10, a reflecting plate 11, a diffusion plate 12, an optical sheet 13 (optical member), and a diffusion sheet 14 (diffusion member). The reflecting plate 11 is arranged oppositely to the respective linear light sources 10 behind the respective linear light sources 10. The diffusion plate 12, the optical sheet 13, and the diffusion sheet 14 are arranged in this order from the respective linear light sources 10 side on the side opposite to the reflecting plate 11 with respect to the respective linear light sources 10. The diffusion plate 12, the optical sheet 13, and the diffusion sheet 14 are arranged oppositely to the respective linear light sources 10.

The plurality of linear light sources 10 are composed of a structure in which a Hot Cathode Fluorescent Lamp (HCFL), a Cold Cathode Fluorescent Lamp (CCFL), or a plurality of point light sources (LED or the like) are linearly arranged. For example, as illustrated in FIG. 1, the plurality of linear light sources 10 are arranged so that respective central axes AX are in parallel with each other or approximately in parallel with each other and are included in a plane (10A). Though not illustrated, the plurality of linear light sources 10 may be arranged in a reticular pattern.

The reflecting plate 11 is arranged oppositely to the respective linear light sources 10 in a position apart from the face 10A including the central axes AX of the respective linear light sources 10 by a given clearance, and has a reflecting face on the linear light sources 10 side. The reflecting face preferably has a diffuse reflection function in addition to a regular reflection function. To express the regular reflection function and the diffuse reflection function, a white colored resin is able to be used for the reflecting face. In this case, high ray reflection characteristics are preferably obtained. Examples of such materials include a polycarbonate resin and a polybutylene terephthalate resin.

The diffusion plate 12 is, for example, a thick and high rigid optical sheet having a light diffusion layer formed by dispersing a diffusion material (filler) in a comparatively thick plate-like transparent resin. The diffusion plate 12 also functions as a support medium that supports other optical sheet (for example, the optical sheet 13 and the diffusion sheet 14). The diffusion plate 12 may be a combination of a sheet formed by dispersing a diffusion material (filler) in a comparatively thick plate-like transparent resin and a sheet formed by coating a comparatively thin film-like transparent resin with a transparent resin (binder) containing a diffusion material.

As the plate-like or film-like transparent resin, for example, a light transmissive thermoplastic resin such as PET, acryl, and polycarbonate is used. The light diffusion layer included in the foregoing diffusion plate 12 has, for example, a thickness from 1 mm to 5 mm both inclusive. Further, the light diffusion material is composed of particles having, for example, an average particle diameter from 0.5 μm to 10 μm both inclusive, which are dispersed in the transparent resin in the range from 0.1 parts by mass to 10 parts by mass to the weight of the foregoing whole light diffusion layer. Examples of light diffusion material types include an organic filler and an inorganic filler. As a light diffusion material, a cavitary particle may be used. Thereby, the diffusion plate 12 has a function to diffuse light from the respective linear light sources 10 or return light from the optical sheet 13 side.

In the case where the light diffusion layer is thinner than 1 mm, there is a possibility that light diffusion characteristics are impaired, and sheet rigidity is not able to be secured in supporting the diffusion plate 12 by a package (not illustrated). Meanwhile, in the case where the light diffusion layer is thicker than 5 mm, there is a possibility that when the diffusion plate 12 is heated by light from the light source, the heat is hardly diffused and the diffusion plate 12 bends. In the case where the average particle diameter of the light diffusion material is in the range from 0.5 μm to 10 μm both inclusive, and the light diffusion material is dispersed in the transparent resin in the range from 0.1 parts by mass to 10 parts by mass to the weight of the whole light diffusion layer, effect as the light diffusion material is able to be effectively expressed, and luminance unevenness is able to be resolved effectively in combination with the after-mentioned optical sheet 13.

The diffusion sheet 14 is a thin optical sheet formed by, for example, coating a comparatively thin film-like transparent resin with a transparent resin containing a light diffusion material. The diffusion sheet 14 has a function to diffuse light that has been transmitted through the diffusion plate 12 and the optical sheet 13.

For example, as illustrated in FIG. 1 and FIG. 2(A), the optical sheet 13 is a thin optical sheet in which a plurality of convex sections 13A, 13B, and 13C are arranged on the face on the diffusion sheet 14 side (light emission side). FIG. 2(A) illustrates an enlarged view of the optical sheet 13 of FIG. 1. FIG. 2(B) illustrates a position relation between the positions of the convex sections 13A, 13B, and 13C of the optical sheet 13 of FIG. 2(A) and the linear light sources 10. The convex section 13A corresponds to a specific example of "a first convex section" of the embodiment, and the convex sections 13B and 13C correspond to a specific example of "a second convex section" of the present invention. FIG. 1 exemplifies a case that the optical sheet 13 is arranged separately from the diffusion plate 12. However, the optical sheet 13 may be bonded onto the surface of the diffusion plate 12 with an adhesive or the like.

The optical sheet 13 may be integrally formed by using a resin material having transmission characteristics such as one type or a plurality types of thermoplastic resins, but may be formed by transcribing an energy ray (for example, ultraviolet ray) cured resin on a transmissive base material such as PET (polyethylene terephthalate).

As the thermoplastic resin, considering a function to control the light emission direction, a thermoplastic resin having a refractive index of 1.4 or more is preferably used. Examples of such a resin include an acrylic resin such as a polycarbonate resin and PMMA (polymethyl methacrylate resin), a poly-olefin system resin such as polyethylene (PE) and polypropylene (PP), a polyester resin such as polyethylene terephthalate, an amorphous copolymer polyester resin such as MS (copolymer of methylmethacrylate and styrene), a polystyrene resin, a polyvinyl chloride resin, a cycloolefin system resin, a urethane system resin, a natural rubber system resin, an artificial rubber system resin, and a combination thereof.

The plurality of convex sections 13A, 13B, and 13C have a three dimensional shape of a line, a spindle, or a waffle extending along a flat face in parallel with the face 10A of the linear light sources 10. In the case where the respective convex sections 13A, 13B, and 13C have the three dimensional shape of a line, the respective convex sections 13A, 13B, and 13C are preferably arranged in parallel so that the extension direction of the respective convex sections 13A, 13B, and 13C is in parallel with the extension direction of the linear light sources 10. However, the extension direction of the respective convex sections 13A, 13B, and 13C may cross the extension direction of the linear light sources 10 in a range allowable based on optical characteristics. Though not illustrated, in the case where a plurality of point light sources are arranged in a reticular pattern, it is preferable that two optical sheets 13 are layered, or the plurality of convex sections 13A, 13B, and 13C have the three dimensional shape of a spindle or a waffle.

The plurality of convex sections 13A are arranged in a first region R1 opposed to the respective linear light sources 10 in the normal line direction of the face 10A. The respective convex sections 13A compose a three dimensional structure (first three dimensional structure) expressing optical characteristics relatively hardly transmitting incident light from the linear light sources 10 side as the whole first region R1. Further, the plurality of convex sections 13B and 13C are arranged in a second region R2 opposed to the intermediate region between one linear light source 10 and another linear light source 10 adjacent to such one linear light source 10 in the normal line direction of the face 10A. The respective convex sections 13B and 13C compose a three dimensional structure (second three dimensional structure) expressing optical characteristics relatively easily transmitting incident light from the linear light sources 10 side as the whole second region R2. Further, in the second region R2, the convex sections 13B are relatively arranged near the linear light sources 10, and the convex sections 13C are relatively arranged apart from the linear light source 10, that is, are arranged in just the center between adjacent linear light sources 10 and in the vicinity thereof.

The state that the first three dimensional structure is more hardly transmits incident light from the linear light sources 10 side relatively than the second three dimensional structure is almost equal to a state that A1 and A2 (described later) satisfy the following Formula (1)

$$A1 - A2 > 0 \tag{1}$$

$$39 \leq \Phi 1 \leq 69 \tag{2}$$

$$39 \leq \Phi 2 \leq 69 \tag{3}$$

As illustrated in FIG. 2, $\Phi 1$ represents an angle made by a tangential face T1 contacted with the convex section 13A and a face T2 in parallel with the face 10A. As illustrated in FIG. 2, $\Phi 2$ represents an angle made by a tangential face T3 contacted with the convex section 13B or the convex section 13C and a face T2 in parallel with the face 10A. A1 represents an occupancy ratio of a portion where $\Phi 1$ satisfies Formula (2) out of the first region R1 when the optical sheet 13 is viewed from the normal line direction of the face 10A. A2 represents an occupancy ratio of a portion where Φ2 satisfies Formula (3) out of the second region R2 when the optical sheet 13 is viewed from the normal line direction of the face 10A.

In the case where Φ1 and Φ2 are less than 39 degree, in the light vertically entering the rear face of the optical sheet 13, the ratio of the light transmitted through the surface of the convex sections 13A, 13B, and 13C is more dominant than the ratio of light that is reflected by the optical sheet 13 and becomes return light. Meanwhile, in the case where Φ1 and Φ2 exceeds 69 degree, though the light vertically entering the rear face of the optical sheet 13 is entirely reflected by one surface of the convex sections 13A, 13B, and 13C, the reflected light is transmitted through other surface of the convex sections 13A, 13B, and 13C, and such transmitted light does not reenter the convex sections 13A, 13B, and 13C. Thus, in this case, again, in the light vertically entering the rear face of the optical sheet 13, the ratio of the light transmitted through the optical sheet 13 is more dominant than the ratio of light that is reflected by the optical sheet 13 and becomes return light. Thus, the front face luminance in the first region R1 (convex section 13A) is higher than that in the second region R2 (convex sections 13B and 13C), and the luminance in a diagonal direction in the first region is lower than that in the second region R2. Accordingly, the light collection property in the first region R1 is higher than that in the second region R2, and the light collection property in the second region R2 is lower than that in the first region R1.

It is preferable that Φ1 and Φ2 become continuously or intermittently larger as the position of Φ1 and Φ2 is shifted from the apex section of the convex sections 13A, 13B, and 13C to the bottom section of the convex sections 13A, 13B, and 13C. For example, as illustrated in FIG. 2, in the case where the convex section 13A has a triangle pole-like three dimensional structure that has a convex-like nonspherical curved face S1 in an apex section 13D and in the vicinity thereof, and a tilted flat face S2 smoothly continuous with the curved face S1 in the other sections, the angle of the tangential face of the tilted flat face S2 (tilt angle of the tilted flat face S2) satisfies the foregoing Formula (2), and the angle of the tangential face of the curved face S1 is small to the degree that the angle does not satisfy the foregoing Formula (2) at least in the apex section 13D and in the very vicinity of the apex section 13D.

Further, for example, as illustrated in FIG. 2, in the case where the convex section 13B has a convex-like nonspherical curved face S3 as a whole and the convex section 13C has a convex-like nonspherical curved face S4 as a whole, both angles of the tangential faces of the curved faces S3 and S4 satisfy the foregoing Formula (3), both angles of the tangential faces of the curved faces S3 and S4 are more moderate (smaller) than the angle of the tangential face of the tilted flat face S2 of the convex section 13A, and the angle of the tangential face of the curved face S4 is more moderate (smaller) than the angle of the tangential face of the curved face S3.

Shapes of the convex sections 13A, 13B, and 13C are not limited to the shapes exemplified as above, but are able to be modified in the range satisfying the foregoing Formulas (1) to (3).

Figure 3A:
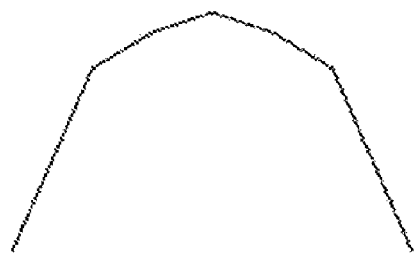
FIG. 3 is a cross sectional structure view of various shapes of the convex sections of the optical sheet of FIG. 1.
Figure 3B:
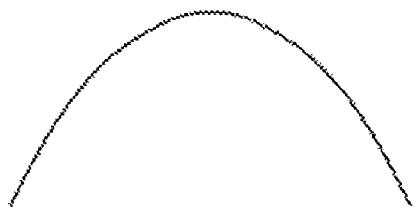
Figure 3C:
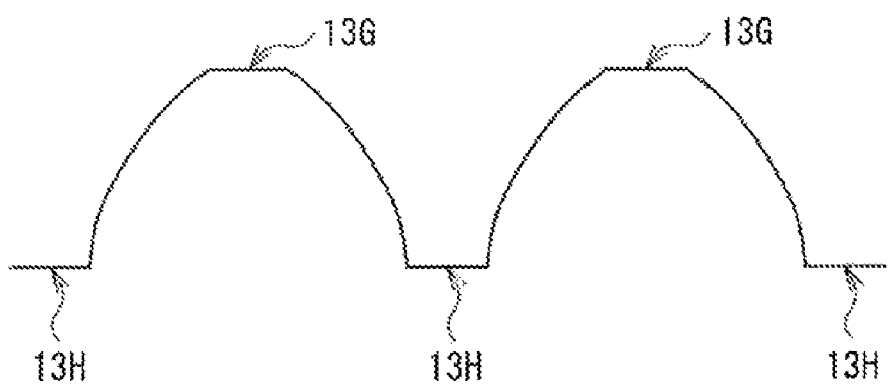

For example, the convex section 13A may be in the non-spherical convex shape as illustrated in the convex sections 13B and 13C of FIG. 2, may be in a triangle pole shape with an apex section not rounded (prism shape), may be in the polygonal pole shape composed of many tilted flat faces as illustrated in FIG. 3(A), may be in the spherical shape as illustrated in FIG. 3(B), or may be in the shape including a flat face 13G as illustrated in FIG. 3(C). Further, as illustrated in FIG. 3(C), a flat face 13H may be provided between adjacent convex sections 13A. Further, for example, the convex sections 13B and 13C may be in the triangle pole-like shape that has a convex-like nonspherical curved face in apex sections 13E and 13F and in the vicinity thereof, and a tilted flat face smoothly continuous with the curved face in the other sections, may be in the polygonal pole shape composed of many tilted flat faces as illustrated in FIG. 3(A), may be in the spherical shape as illustrated in FIG. 3(B), or may be in the shape including the flat face 13G as illustrated in FIG. 3(C). In the case where the convex section 13A and the convex section 13B/13C respectively have a convex-like curved face, the curvature of the curved face of the convex section 13A is preferably smaller than the curvature of the curved face of the convex section 13B/13C. Similarly, in the case where the convex section 13A and the convex section 13B/13C respectively have a tilted flat face, the tilt angle of the tilted flat face of the convex section 13A is preferably larger than the tilt angle of the tilted flat face of the convex section 13B/13C. Further, as a result of providing a tilted flat face having a large tilt angle in the convex section 13A, the height of the convex section 13A may be larger than the height of the convex section 13B/13C. Further, as illustrated in FIG. 3(C), the flat face 13H may be provided between adjacent convex sections 13B, between adjacent convex sections 13C, or between adjacent convex sections 13B and 13C. Further, it is possible that the flat face 13H is provided not only in a region where the convex sections 13A, 13B, and 13C are not formed, but also is further provided in the apex sections of the convex sections 13A, 13B, and 13C. In the case where the first region R1 and the second region R2 respectively have a flat face, where the occupancy ratio of the flat face in the first region R1 out of the first region R1 when the optical sheet 13 is viewed from the normal line direction of the face 10A is K3, and the occupancy ratio of the flat face in the second region R2 out of the second region R2 when the optical sheet 13 is viewed from the normal line direction of the face 10A is K4, K3 and K4 preferably satisfy the following Formula (4).

$$K4-K3>0 \qquad (4)$$

However, Formulas (2) and (3) are suitably applied to a case that a material having a refractive index of about from 1.5 to 1.6 generally used for an optical member is used for the optical sheet 13. Thus, in the case where a material not generally used is used for the optical sheet 13, the upper limit value and the lower limit value of the foregoing Formulas (2) and (3) are slightly shifted, and thus the upper limit value and the lower limit value should be slightly adjusted according to the material.

Further, the forgoing Formulas (1) to (3) are able to be applied to various profiles generally belonging to light entering the light incident surface of the optical sheet 13. Thus, regarding the light entering the light incident surface of the optical sheet 13, for example, in the case where luminance of a component vertically entering the light incident surface has a higher profile than that of luminance of a component diagonally entering the light incident surface, or in the case where luminance of a component vertically entering the light incident surface has a profile almost equal to that of luminance of a component diagonally entering the light incident surface (typically, in the case of Lambert light), the forgoing Formulas (1) to (3) are able to be applied.

Further, in the case where the second region R2 is divided into a plurality of sections according to the distance from the linear light sources 10, it is preferable that each occupancy ratio of the portion in which Φ2 satisfies Formula (3) out of the respective divided plurality of sections is gradually or intermittently increased as the position of the section recedes from the linear light sources 10 when the optical sheet 13 is viewed from the normal line direction of the face 10A. Further, in the case where the first region R1 is divided into a plurality of sections according to the distance from the linear light sources 10, it is preferable that each occupancy ratio of the portion in which Φ1 satisfies Formula (2) out of the respective divided plurality of sections is gradually or intermittently increased as the position of the section recedes from the linear light sources 10 when the optical sheet 13 is viewed from the normal line direction of the face 10A.

Figure 4:
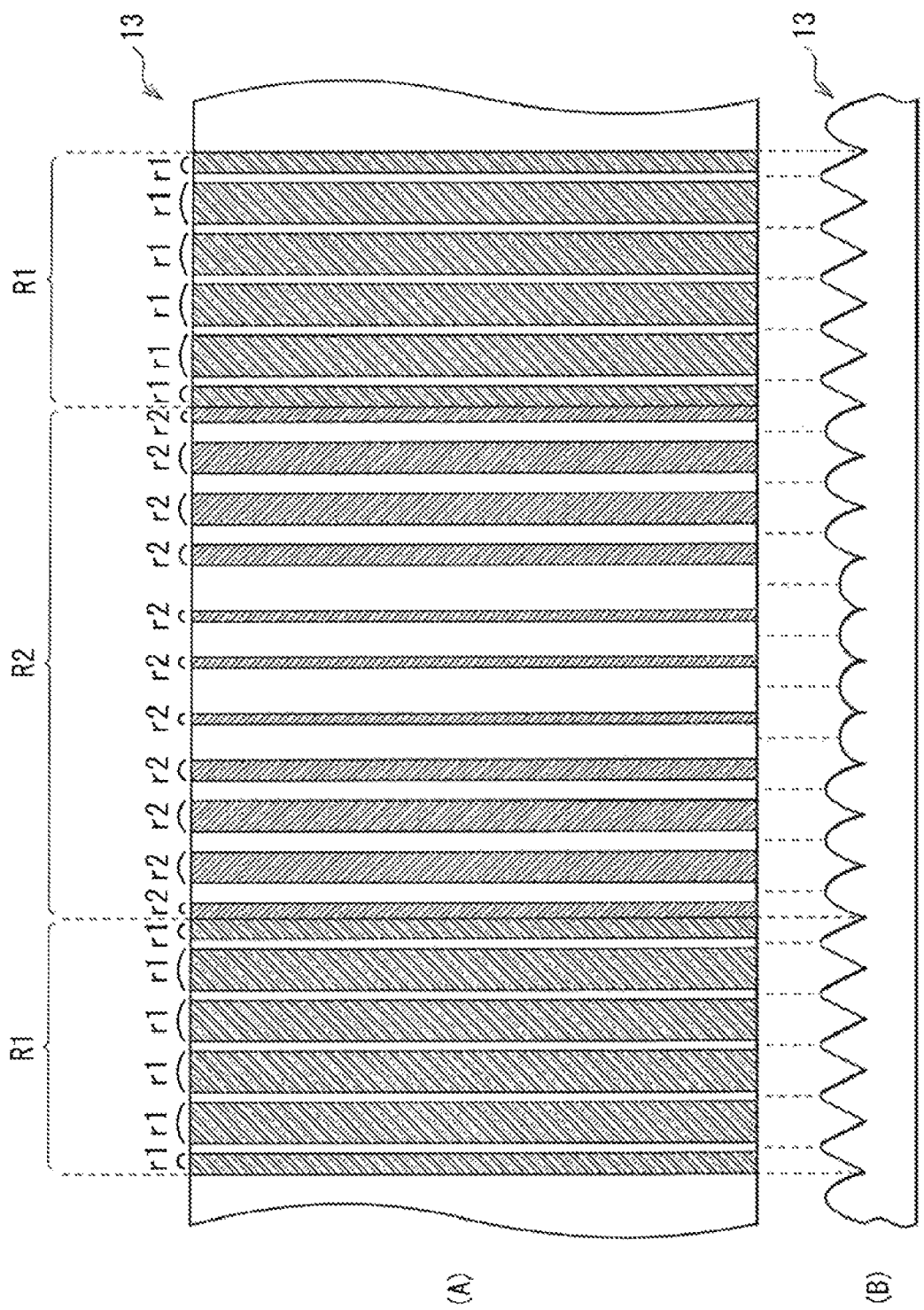
FIG. 4 is a conceptual view for explaining a return light generation section.

As illustrated in FIGS. 4(A) and 4(B), regarding the convex sections 13A, 13B, and 13C, where an occupancy ratio of a return light generation section r1 (first section) in which light from the respective linear light sources 10 vertically entering the light incident surface of the optical sheet 13 is entirely reflected by the surface of the convex section 13A and return light is generated out of the first region R1 when the optical sheet 13 is viewed from the normal line direction of the face 10A is K1; and where an occupancy ratio of a return light generation section r2 (second section) in which light from the respective linear light sources 10 vertically entering the light incident surface of the optical sheet 13 is entirely reflected by the surface of the convex sections 13B and 13C and return light is generated out of the second region R2 when the optical sheet 13 is viewed from the normal line direction of the face 10A is K2, K1 and K2 preferably satisfy at least the following Formula (5), and preferably satisfy the following Formulas (6) to (10). Further, in the case where K1 and K2 satisfy Formulas (5) to (10), K2 is preferably 0.

$$K1-K2>0 \quad (5)$$

$$K1-K2\geq 0.03 \quad (6)$$

$$K1-K2\geq 0.06 \quad (7)$$

$$K1-K2\geq 0.12 \quad (8)$$

$$K1-K2\geq 0.15 \quad (9)$$

$$K1-K2\geq 0.18 \quad (10)$$

FIG. 4(A) schematically illustrates a distribution example of the return light generation sections r1 and r2 when the optical sheet 13 is viewed from the top face. FIG. 4(B) is a side view of the optical sheet 13, and illustrates a relation between the distribution of the return light generation sections r1 and r2 illustrated in FIG. 4(A) and the convex sections 13A, 13B, and 13C.

Figure 5:
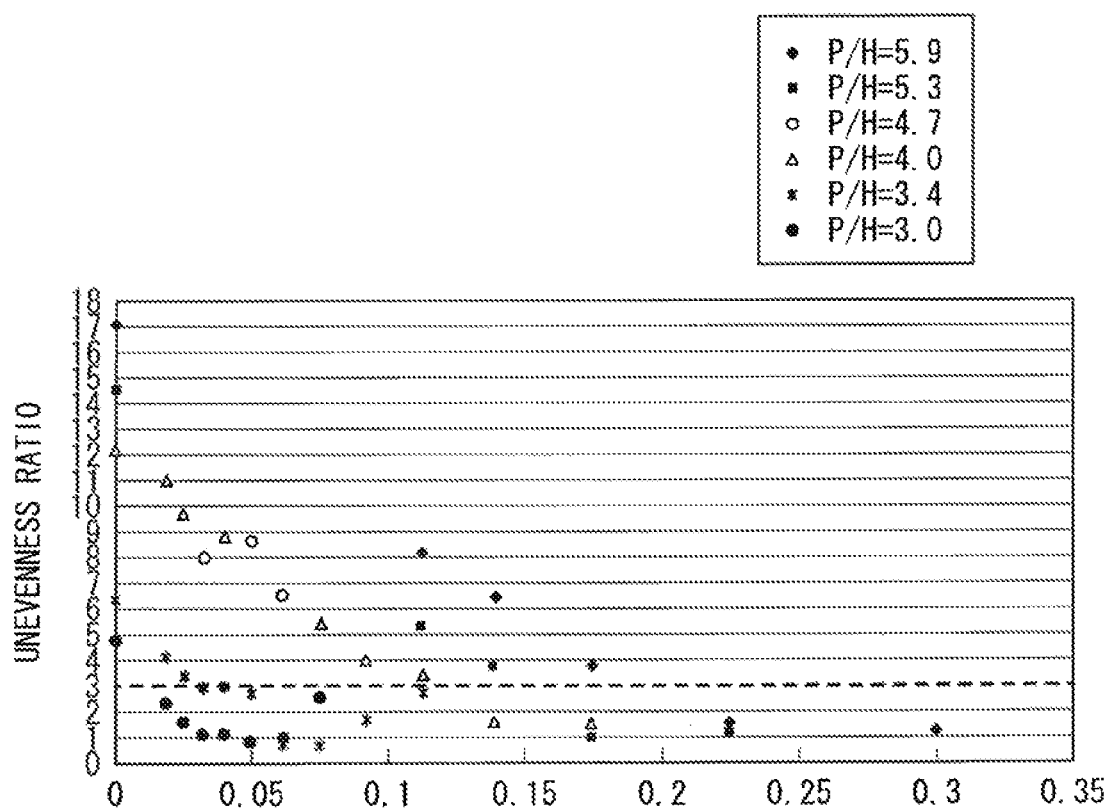
FIG. 5 is a relation view illustrating a relation between an unevenness ratio and P/H.

FIG. 5 illustrates a relation between an unevenness ratio obtained by the following Formula (11) and P/H. P represents a distance between a central axis AX of one linear light source 10 and a central axis AX of another linear light source 10 adjacent to such one linear light source 10 (refer to FIG. 2). H represents a distance between a face on the linear light source 10 side (face 10A side) out of the optical sheet 13 and the face 10A (refer to FIG. 2). The unevenness ratio of FIG. 5 is obtained by measuring light radiated from the diffusion sheet 14. The dotted line in FIG. 5 is drawn where the unevenness ratio is 3%. The unevenness ratio 3% is the upper limit of values at which people are not able to recognize display unevenness (or people are not annoyed at display unevenness), and is one of the indicators in display quality.

$$\text{Unevenness ratio(\%)}=((\text{maximum luminance}-\text{minimum luminance})/\text{average luminance})*100 \quad (11)$$

Based on FIG. 5, in the case where K1 and K2 satisfy Formula (6), P/H is able to be increased up to 3.4. In the case where K1 and K2 satisfy Formula (7), P/H is able to be increased up to 4.0. In the case where K1 and K2 satisfy Formula (8), P/H is able to be increased up to 4.7. In the case where K1 and K2 satisfy Formula (9), P/H is able to be increased up to 5.3. In the case where K1 and K2 satisfy Formula (10), P/H is able to be increased up to 5.9.

Next, a description will be given of action and effect of the illuminating device 1 according to this embodiment.

In the illuminating device 1 of this embodiment, light radiated from the respective linear light sources 10 directly enters the diffusion plate 12, or is reflected by the reflecting plate 11 or the like and then enters the diffusion plate 12. After that, the light is diffused by the diffusion plate 12. The diffused light enters the rear face of the optical sheet 13, is collected or diffused according to the shape of the convex sections 13A, 13B, and 13C formed on the top face thereof. After that, the light is diffused by the diffusion sheet 14, and illuminates an irradiation object (not illustrated) arranged on the diffusion sheet 14.

In general, regarding incidence light from various directions, a prism sheet orients light of a specific direction to the front face direction (direction perpendicular to the entrance face), and entirely reflects light entering at an angle close to the angle perpendicular to the entrance face and returns the light back to the light source side. Each base angle of each prism of the prism sheet acting as above is generally from 40 degree to 58 degree both inclusive. Thus, the optical sheet including the tilt angle within such a range has a strong light collection action similar to the foregoing prism sheet, and also has an action to return much light, that is, an action that makes light hardly transmitted. Thus, a three dimensional structure having a strong light collection action is also a three dimensional structure generating return light.

In view of the foregoing, a three dimensional structure having a weak light collection action (or strong diffusion characteristics) is also a three dimensional structure that hardly transmits light and hardly generates return light. Thus, in the case where an optical sheet in which a three dimensional structure having a relatively strong light collection action and a three dimensional structure having a relatively weak light collection action (or strong diffusion characteristics) are mixed is provided directly above the light source, and a reflecting plate is provided directly beneath the light source, return light that has been reflected by the three dimensional structure having a relatively strong light collection action and is oriented toward the reflecting plate is, for example, reflected by the reflecting plate or the like, and is cycled in the illuminating device. After that, much of the cycled light is transmitted through a section that easily transmits light relatively. That is, the three dimensional structure having a relatively weak light collection action (or strong diffusion characteristics).

Figure 6:
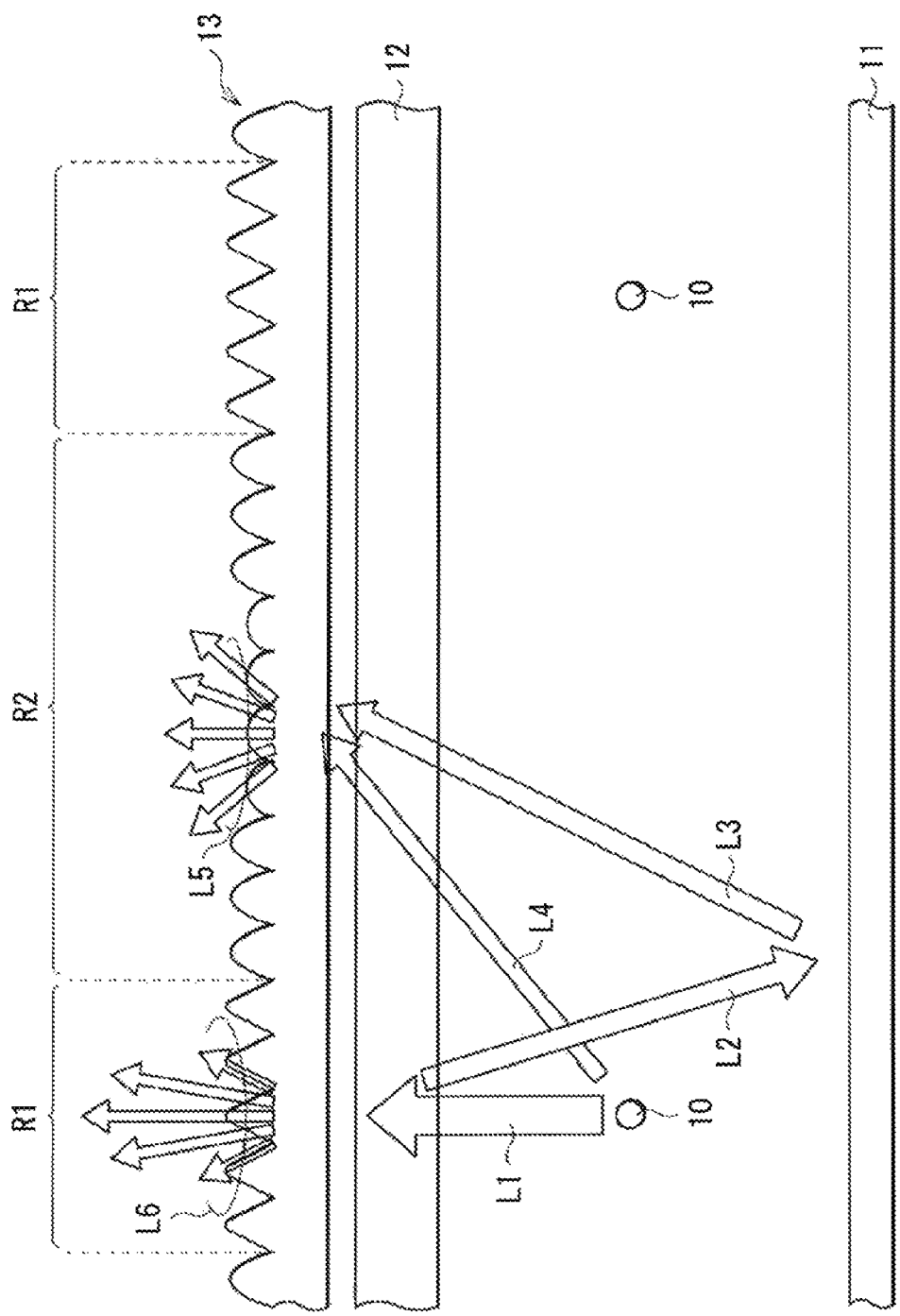
FIG. 6 is a conceptual view for explaining an example of optical action of the optical sheet of FIG. 1.

A description will be given by applying the foregoing principle to this embodiment. In this embodiment, the first region R1 directly above the respective linear light sources 10 more hardly transmits light than the second region R2 sandwiched between the first regions R1 (that is, Formulas (1) to (3) and Formula (5) are satisfied). Thus, as illustrated in FIG. 6, out of incident light L1 toward the first region R1, return light L2 that has been reflected by the first region R1 and is oriented from the first region R1 toward the reflecting plate 11 is reflected by the reflecting plate 11 or the like. After the light is cycled in the illuminating device 1, much of cycled light L3 is transmitted through the second region R2 easily transmitting light relatively. Further, much of incident light L4 from the linear light sources 10 directly entering the second region R2 is transmitted through the second region R2. In result, if the light amount distribution of light entering the optical sheet 13 is compared to the light amount distribution of light transmitted through the optical sheet 13, light amount is shifted from the first region R1 to the second region R2.

Further, the second region R2 transmits light more easily than the first region R1. Thus, in the second region R2, the light collection characteristics are weak (or the light collection characteristics do not exist), or the diffusion characteristics are strong. Thereby, as illustrated in FIG. 6, the light amount of light L5 transmitted through the second region R2 is distributed not only in the front face direction but also is widely distributed in diagonal directions. Thus, not only the light amount in the front face direction of the light L5, but also the light amount in the diagonal directions thereof is able to be increased. Meanwhile, in the first region R1, the light collection characteristics are strong. Thus, the light amount of light L6 transmitted through the first region R1 is more oriented to the front face direction than the light L5. Thereby, the light amount in the diagonal directions of the light L6 is decreased, and thus a difference between the light amount in the diagonal directions of the light L6 and the light amount in the diagonal directions of the light L5 is able to be decreased. In result, luminance unevenness in a plane when viewed from a diagonal direction is able to be decreased.

However, the first region R1 is located directly above the respective linear light sources 10. Thus, out of light radiated from the respective linear light sources 10, light originally having much light amount is collected by light collection action in the first region R1. In result, when the optical sheet 13 is viewed from the front face direction, the section corresponding to the first region R1 is lighter than in a case that the optical sheet 13 is not provided. However, in this embodiment, the diffusion sheet 14 is arranged directly above the optical sheet 13. Thus, the light amount in the front face direction and the light amount in the diagonal directions are averaged by the diffusion sheet 14. In result, luminance unevenness both in the front face direction and luminance unevenness in the diagonal directions are able to be decreased.

FIG. 6 schematically illustrates a state that the luminance in the front face direction of the light L5 is smaller than the luminance in the front face direction of the light L6, and the luminance in the diagonal directions of the light L5 is larger than the luminance in the diagonal directions of the light L6. The light L5 and L6 having such a profile is diffused by the diffusion sheet 14, and thereby light radiated from the diffusion sheet 14 becomes diffused light (typically, Lambert light) in which the luminance in the front face direction is almost equal to the luminance in the diagonal directions. In result, not only in-plane luminance unevenness in the front face direction but also in-plane luminance unevenness viewed from the diagonal directions is able to be decreased.

Figure 7:
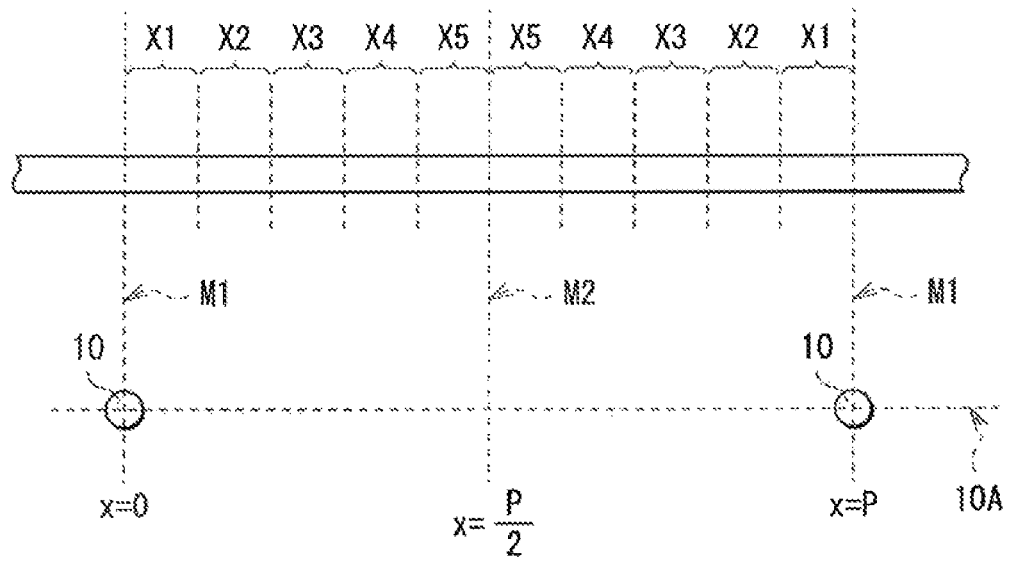
FIG. 7 is a conceptual view for explaining an arrangement of the convex sections of the optical sheet of FIG. 1.
Figure 8:
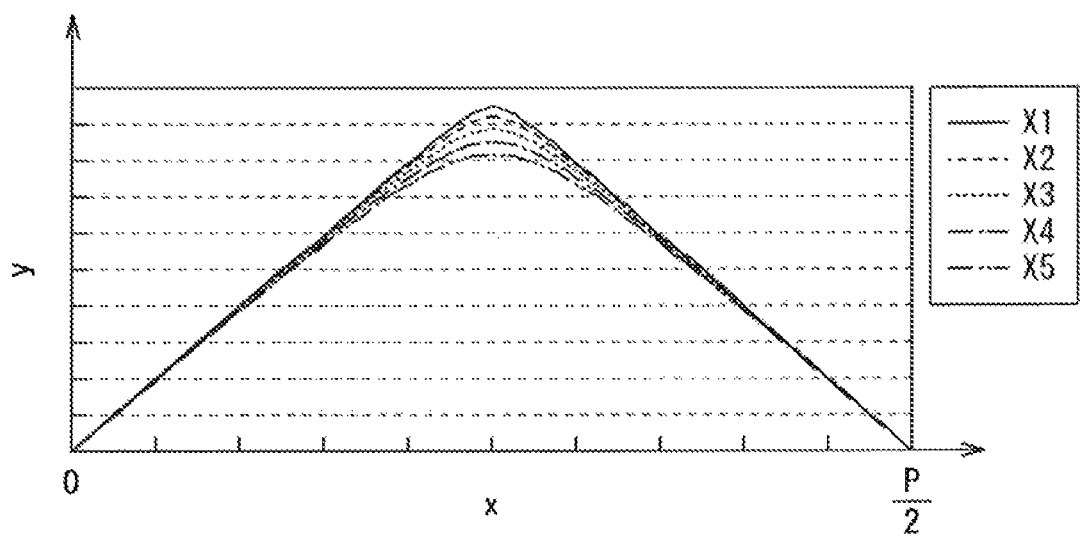
FIG. 8 is a diagram illustrating shapes of cross sections of convex sections for each section of an optical sheet according to an example.
Figure 9:
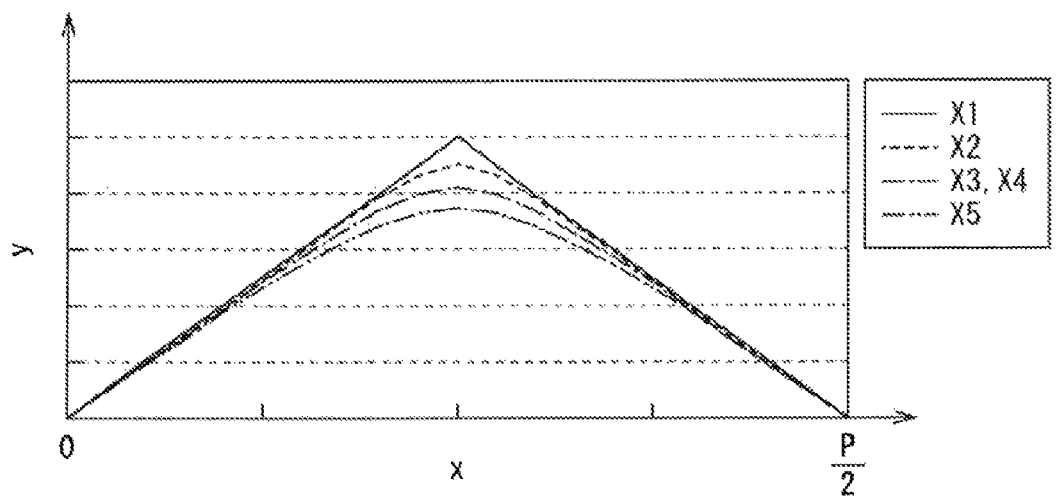
FIG. 9 is a diagram illustrating shapes of cross sections of convex sections for each section of an optical sheet according to a comparative example.

For example, as illustrated in FIG. 7, Example 1 has a structure as follows. That is, a line passing thorough the respective central axes AX is X axis, a line perpendicular to the X axis is Y axis, the central axis AX of one linear light source 10 is the original point of the X axis, the distance between line M1 passing the original point and line M2 passing a location apart from the original point by P/2 (center between linear light sources 10) is equally divided into five sections (X1 to X5), and shapes of the convex sections of the optical sheet 13 included in the respective sections are the shapes illustrated in FIG. 8. Meanwhile, Comparative example 1 has a structure that shapes of the convex sections of the optical sheet 13 included in the foregoing respective sections are the shapes illustrated in FIG. 9. That is, the arrangement of the convex section of Comparative example 1 is opposite to the arrangement of the convex section of Example 1 with regard to position relation with the linear light sources 10.

Figure 10:
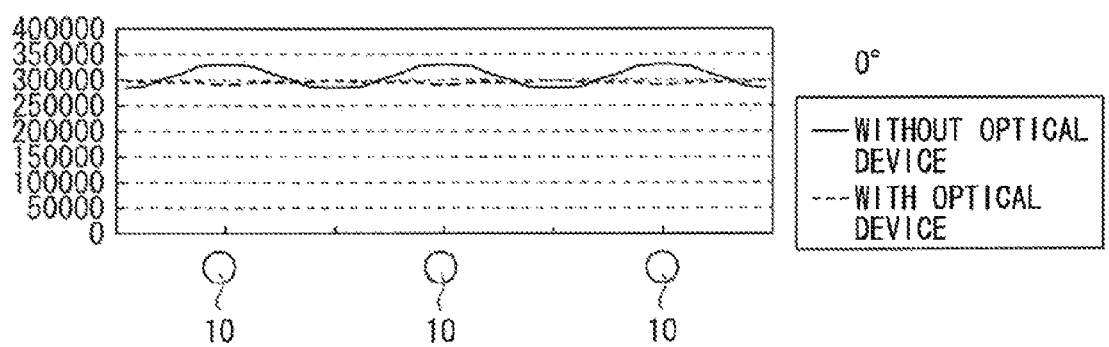
FIG. 10 is a distribution diagram illustrating an in-plane luminance distribution in the front face direction of the example.
Figure 11:
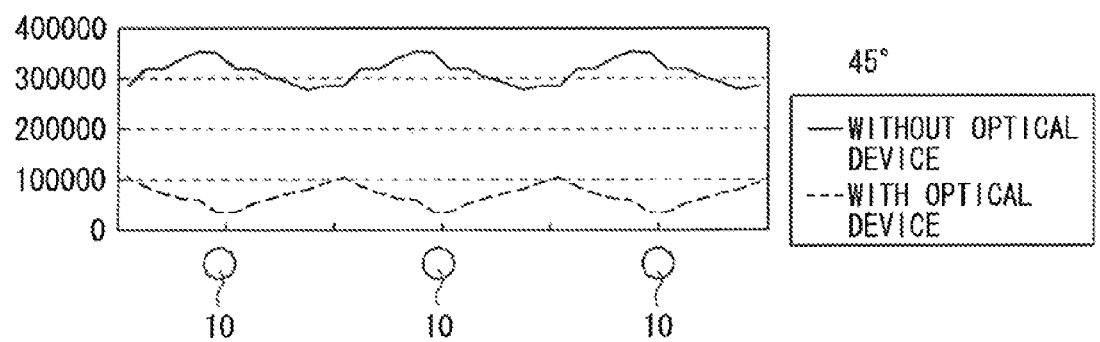
FIG. 11 is a distribution diagram illustrating an in-plane luminance distribution in a diagonal direction of the example.
Figure 12:
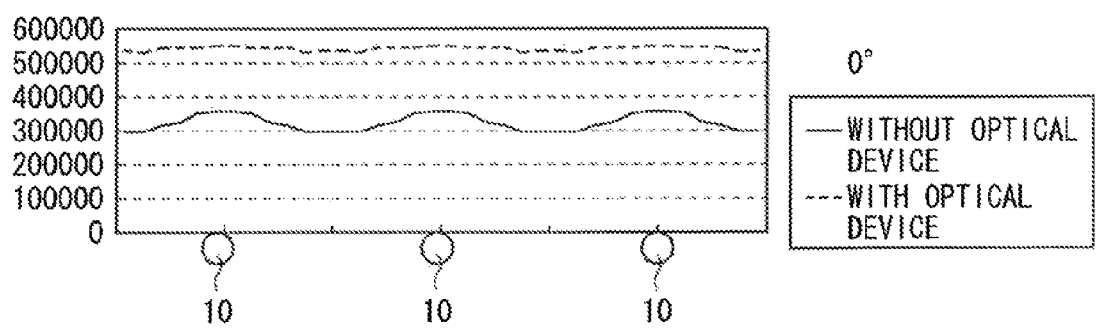
FIG. 12 is a distribution diagram illustrating an in-plane luminance distribution in the front face direction of the comparative example.
Figure 13:
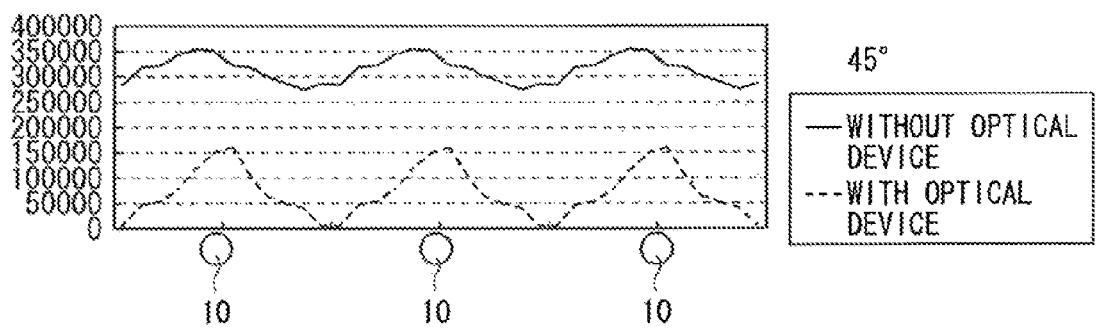
FIG. 13 is a distribution diagram illustrating an in-plane luminance distribution in a diagonal direction of the comparative example.

Specifically, in Example 1, the convex sections having relatively strong light collection action are formed above the linear light sources 10, and the convex sections having relatively weak light collection action (or strong diffusion characteristics) are formed above the location between the linear light sources 10. Meanwhile, in Comparative example 1, the convex sections having relatively weak light collection action (or strong diffusion characteristics) are formed above the location between the linear light sources 10, and the convex sections having relatively strong light collection action are formed above the linear light sources 10. In the range of $P/2 \leq x \leq P$, convex sections having a shape obtained by reversing the shape in the range of $0 \leq x \leq P/2$ are arranged, and the respective convex sections are cyclically arranged correspondingly to the linear light sources 10. Simulation results in this case are illustrated in FIG. 10 to FIG. 13. FIG. 10 illustrates in-plane luminance distributions in the front face direction of the case using the optical sheet of Example 1 and of the case not using the same. FIG. 11 illustrates in-plane luminance distributions in a diagonal direction of the case using the optical sheet of Example 1 and of the case not using the same. FIG. 12 illustrates in-plane luminance distributions in the front face direction of the case using the optical sheet of Comparative example 1 and of the case not using the same. FIG. 13 illustrates in-plane luminance distributions in a diagonal direction of the case using the optical sheet of Comparative example 1 and of the case not using the same.

From FIG. 12 to FIG. 13, it is found that in the case of using the optical sheet of Comparative example 1, luminance unevenness is increased both in the front face direction and in the diagonal direction (that is, luminance unevenness is not resolved). Meanwhile, from FIG. 10 to FIG. 11, it is found that in the case of using the optical sheet of Example 1, luminance unevenness is decreased both in the front face direction and in the diagonal direction. That is, as in Example 1, by collecting light by the convex sections having relatively strong light collection action above the linear light sources 10 having much light amount, and diffusing light by the convex sections having relatively weak light collection action (or strong diffusion characteristics) above the location between the linear light sources 10 having small light amount, in-plane luminance unevenness is able to be decreased both in the front face direction and in the diagonal directions.

Further, in this embodiment, in the case where the first region R1 and the second region R2 respectively have a flat face, if Formula (4) is satisfied, Formula (1) or Formula (5) is to be satisfied even if the shape and the size of the convex sections formed in the first region R1 and the second region R2 are the same. Therefore, in this case, in-plane luminance unevenness is able to be decreased both in the front face direction and in a diagonal direction.

In general, if P/H is increased, in-plane luminance unevenness is generated. P/H is increased resulting from the following two cases. One thereof is a case that the distance between the linear light sources 10 and the diffusion plate 12 is narrowed to obtain a thin device. The other thereof is a case that the number of linear light sources 10 is decreased to realize thrifty lighting. The display unit in this embodiment is suitable for thrifty lighting out of the two cases. In this embodiment, if the position of K1 in the optical sheet 13 is shifted in the arrangement direction of the linear light sources 10 with respect to the linear light sources 10, luminance unevenness may be generated. However, in the case where the distance between the linear light sources 10 is widened by thrifty lighting (in general, P≧30 mm), effect of luminance unevenness generated by position shift of K1 is small, and thus there is almost no possibility that effect of decreasing luminance unevenness is ruined. Thus, in this embodiment, thrifty lighting is able to be effectively realized without deteriorating luminance unevenness.

Next, a description will be given of an example of methods of forming the optical sheet 13 of this embodiment.

Though not exclusive to the optical sheet 13, in forming a sheet-like optical device, in the case where a thermoplastic resin is used to structure an integral body or in the case where an ultraviolet cure resin is transferred onto a base material, it is necessary to previously prepare a transfer original sheet (die). The original sheet is able to be formed, for example, by cutting the surface of a metal roll with a blade having a shape desirably transferred. At this time, in the case where a plurality of types of shapes of the convex sections transferred to the optical sheet 13 exist as illustrated in FIG. 2, the necessary number of blades is the same as the number of the plurality of types of shapes of the convex sections transferred to the optical sheet 13, resulting in increased manufacturing cost.

Figure 14A:
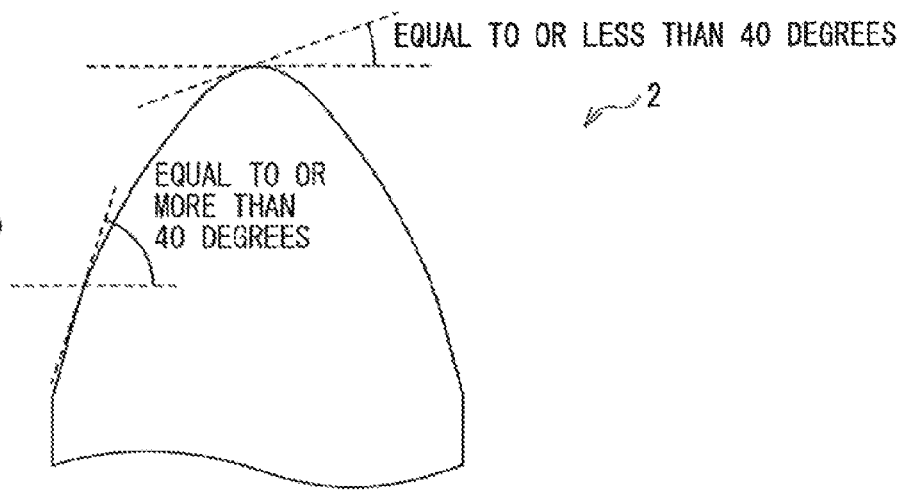
FIG. 14 is a cross sectional structure view illustrating an example of an end shape of a blade for cutting an original sheet.
Figure 14B:
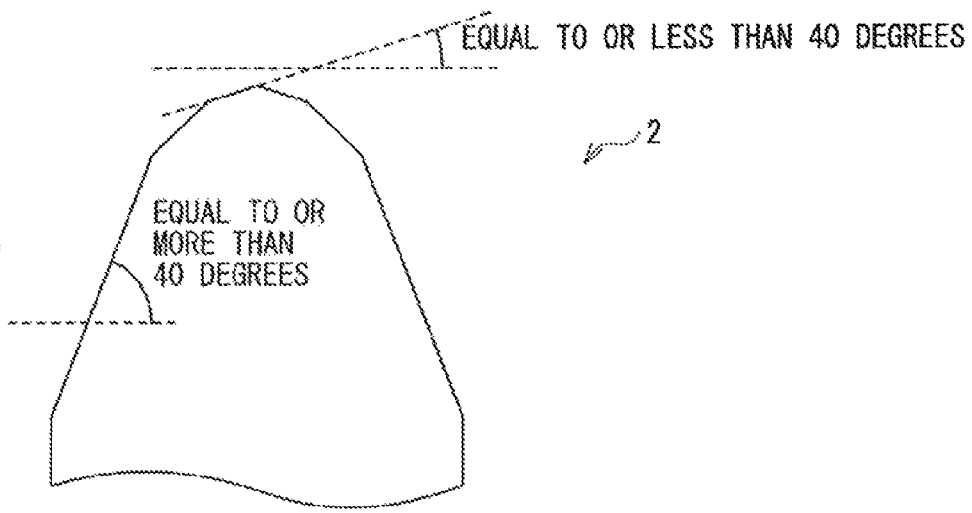
Figure 15:
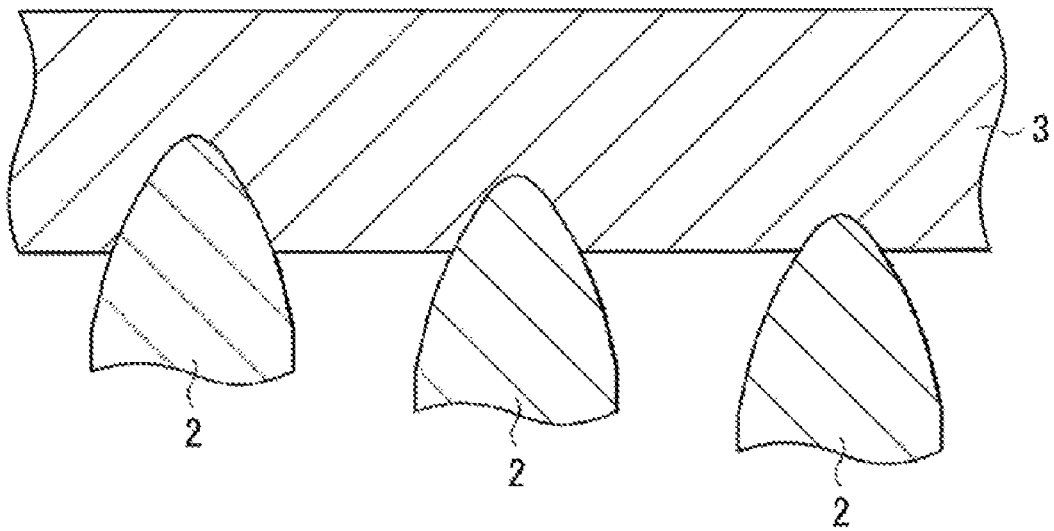
FIG. 15 is a conceptual view for explaining an example of a method of cutting the original sheet.
Figure 16:
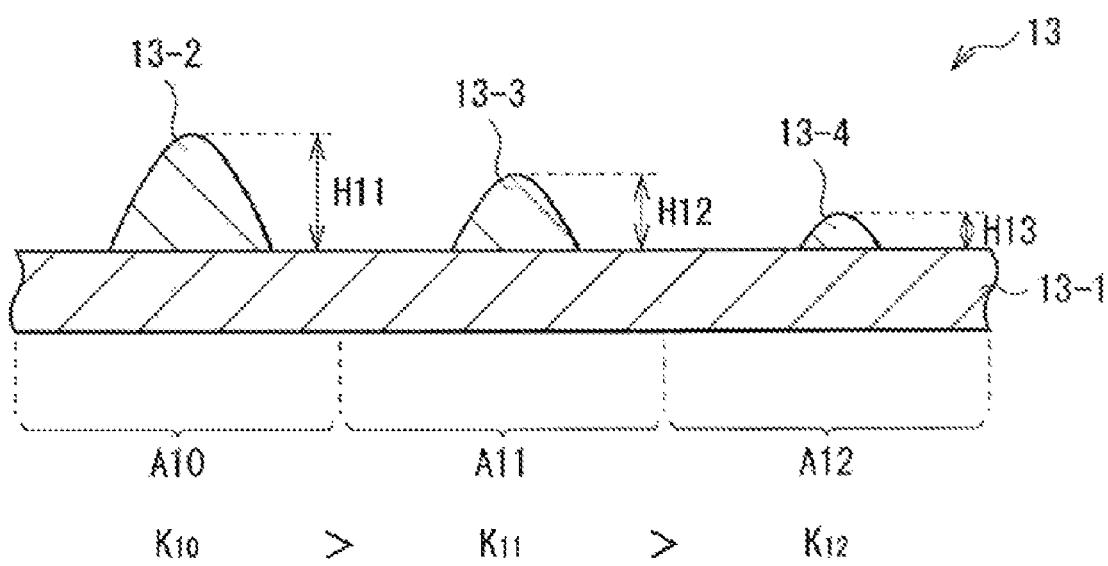
FIG. 16 is a cross sectional structure view of an optical sheet prepared by using the original sheet formed by the cutting method of FIG. 15.

It is preferable that a blade 2 in which the angle of a tangential surface in the vicinity of the apex section is 40 degree or less and the angle of a tangential surface in the vicinity of the bottom section is 40 degree or more is prepared as illustrated in FIGS. 14(A) and 14(B), and a cutting depth in the original sheet 3 cut by the blade 2 is changed according to the cutting position as illustrated in FIG. 15. In the case where, as illustrated in FIG. 16, convex sections 13-2, 13-3, and 13-4 having a height and a shape corresponding to the cutting depth are formed on a base material 13-1 by using the original sheet 3 formed as above, occupancy ratios (K10, K11, and K12) of sections where return light is generated in respective regions (A10, A11, and A12) are able to be different from each other. As above, since the optical sheet 13 is able to be formed only by forming the original sheet 3 with the use of the single blade 2, the manufacturing cost is able to be inhibited from being raised. Further, in this case, since the height of each convex section is different from each other according to the position thereof, the optical sheet 13 is prevented from being adhered to other optical device arranged on the convex section side.

Figure 17:
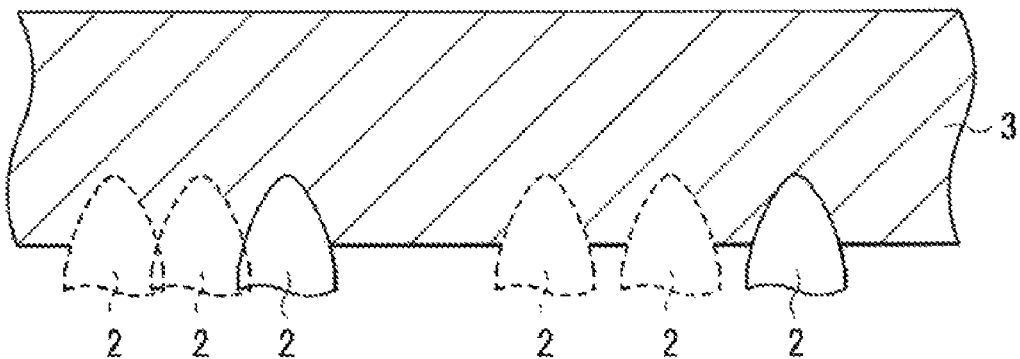
FIG. 17 is a conceptual view for explaining another example of a method of cutting the original sheet.
Figure 18:
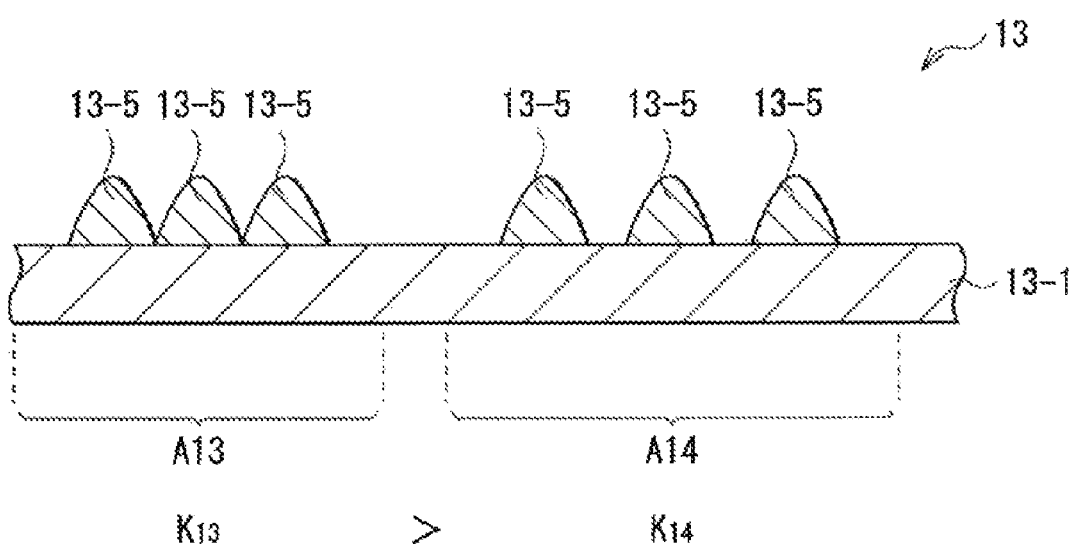
FIG. 18 is a cross sectional structure view of an optical sheet prepared by using the original sheet formed by the cutting method of FIG. 17.

Further, for example, it is possible that the blade 2 in which the angle of a tangential surface in the vicinity of the apex section is 40 degree or less and the angle of a tangential surface in the vicinity of the bottom section is 40 degree or more is prepared, and a cutting width (pitch) of the blade 2 to the original sheet 3 is changed as illustrated in FIG. 17. In the case where, as illustrated in FIG. 18, a plurality of convex sections 13-5 having a pitch corresponding to the cutting width are formed on the base material 13-1 by using the original sheet 3 formed as above, occupancy ratios (K13 and K14) of sections where return light is generated in respective regions (A13 and A14) are able to be different from each other. As described above, since the optical sheet 3 is able to be formed only by forming the original sheet 3 with the use of the single blade 2, the manufacturing cost is able to be inhibited from being raised.

MODIFIED EXAMPLES

Figure 19:
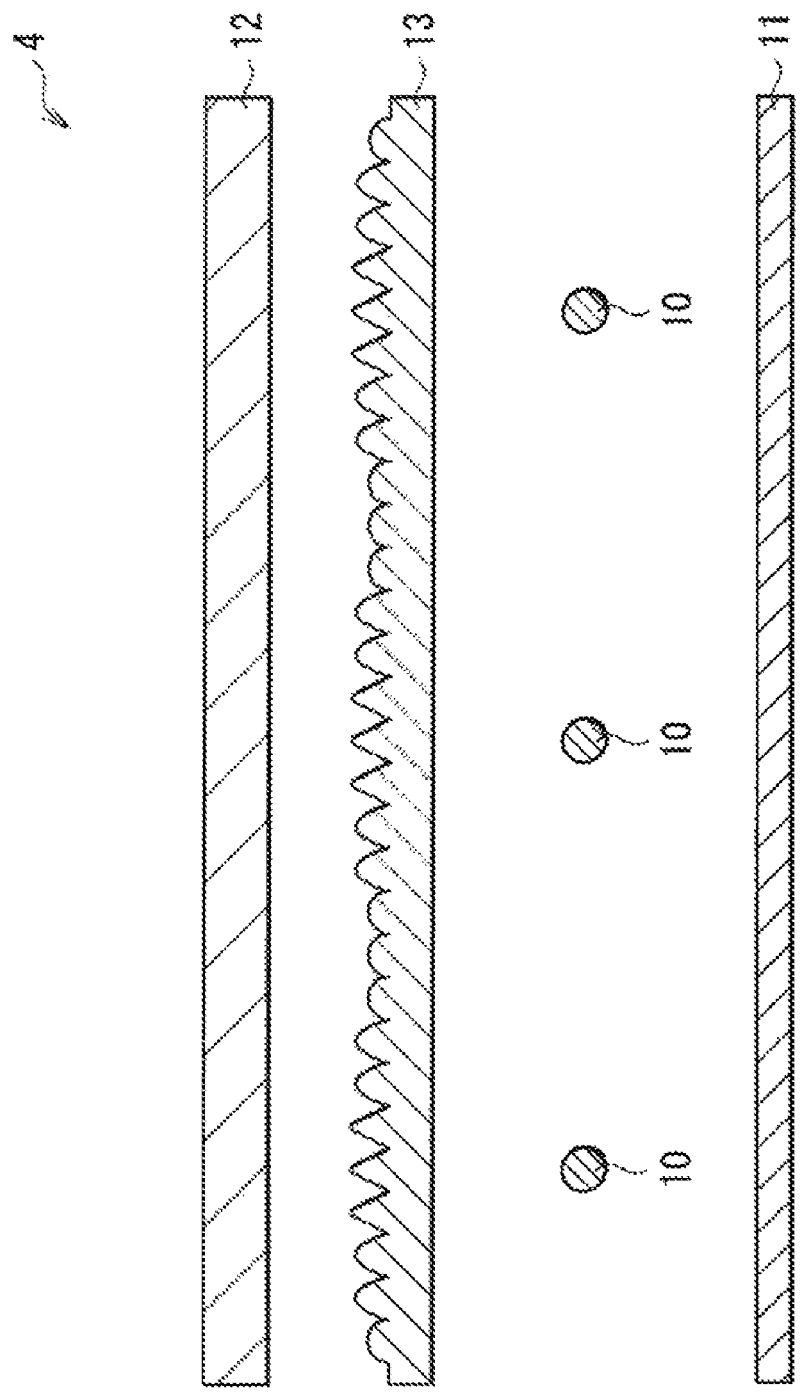
FIG. 19 is a cross sectional structure view of a modified example of the illuminating device of FIG. 1.
Figure 20:
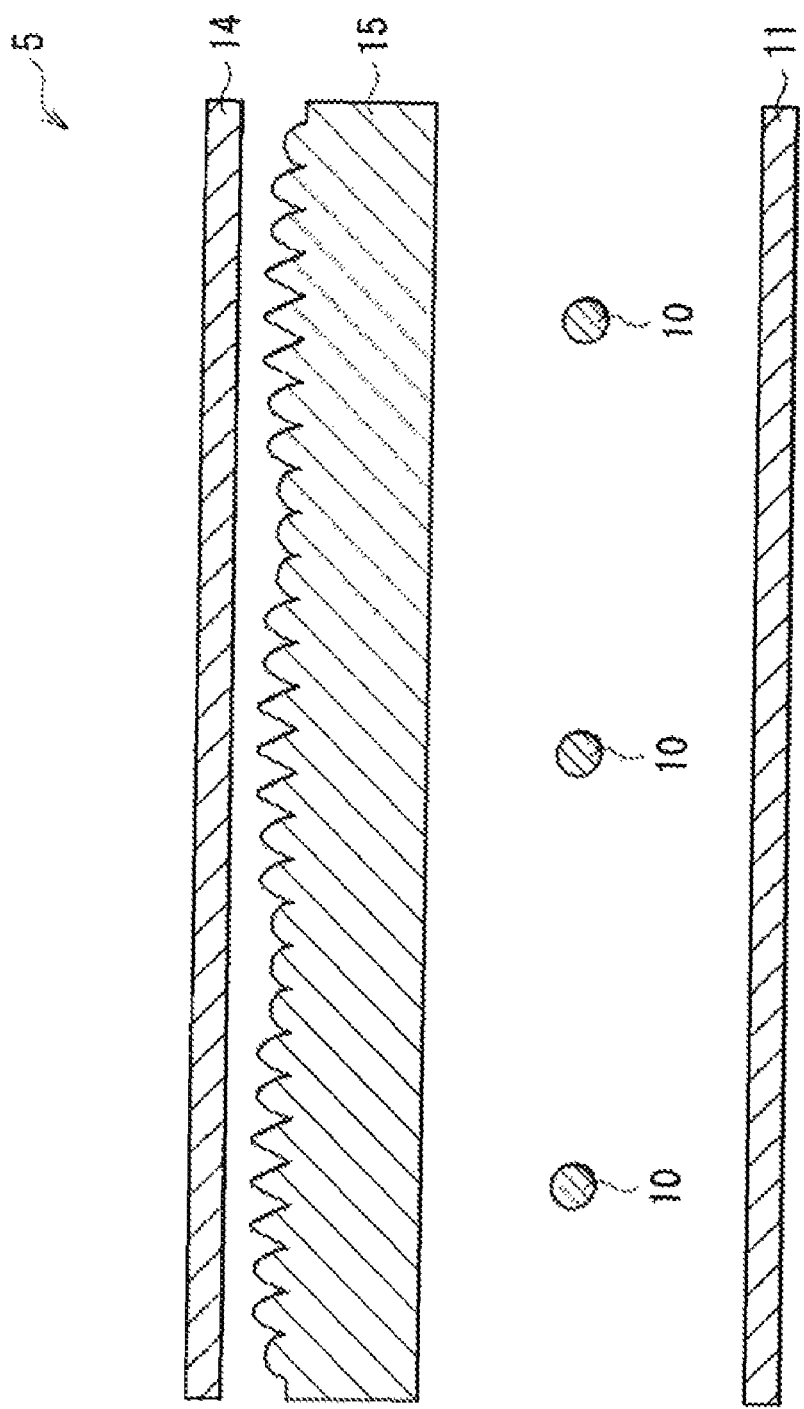
FIG. 20 is a cross sectional structure view of another modified example of the illuminating device of FIG. 1.

In the foregoing embodiment, the diffusion plate 12 is arranged between the optical sheet 13 and the linear light sources 10. As illustrated in an illuminating device 4 of FIG. 19, the diffusion plate 12 may be arranged on the optical sheet 13. However, in this case, since the linear light sources 10 are arranged directly beneath the optical sheet 13, it is preferable to provide ingenuity to improve positioning precision of the optical sheet 13 with respect to the linear light source 10. Further, as illustrated in an illuminating device 5 of FIG. 20, it is possible that on the surface on the light emission side of a base material having a function similar to that of the diffusion plate 12, an optical sheet 15 including convex sections having characteristics similar to those of the convex sections of the optical sheet 13 is provided directly above the linear light sources 10, and the diffusion sheet 14 is provided thereon. The optical sheet 15 may be formed in block by using, for example, a method such as fusion extrusion process and injection molding method. Otherwise, for example, the optical sheet 15 may be formed by bonding the optical sheet 13 containing a diffusion agent to the surface of the diffusion plate 12.

Figure 21:
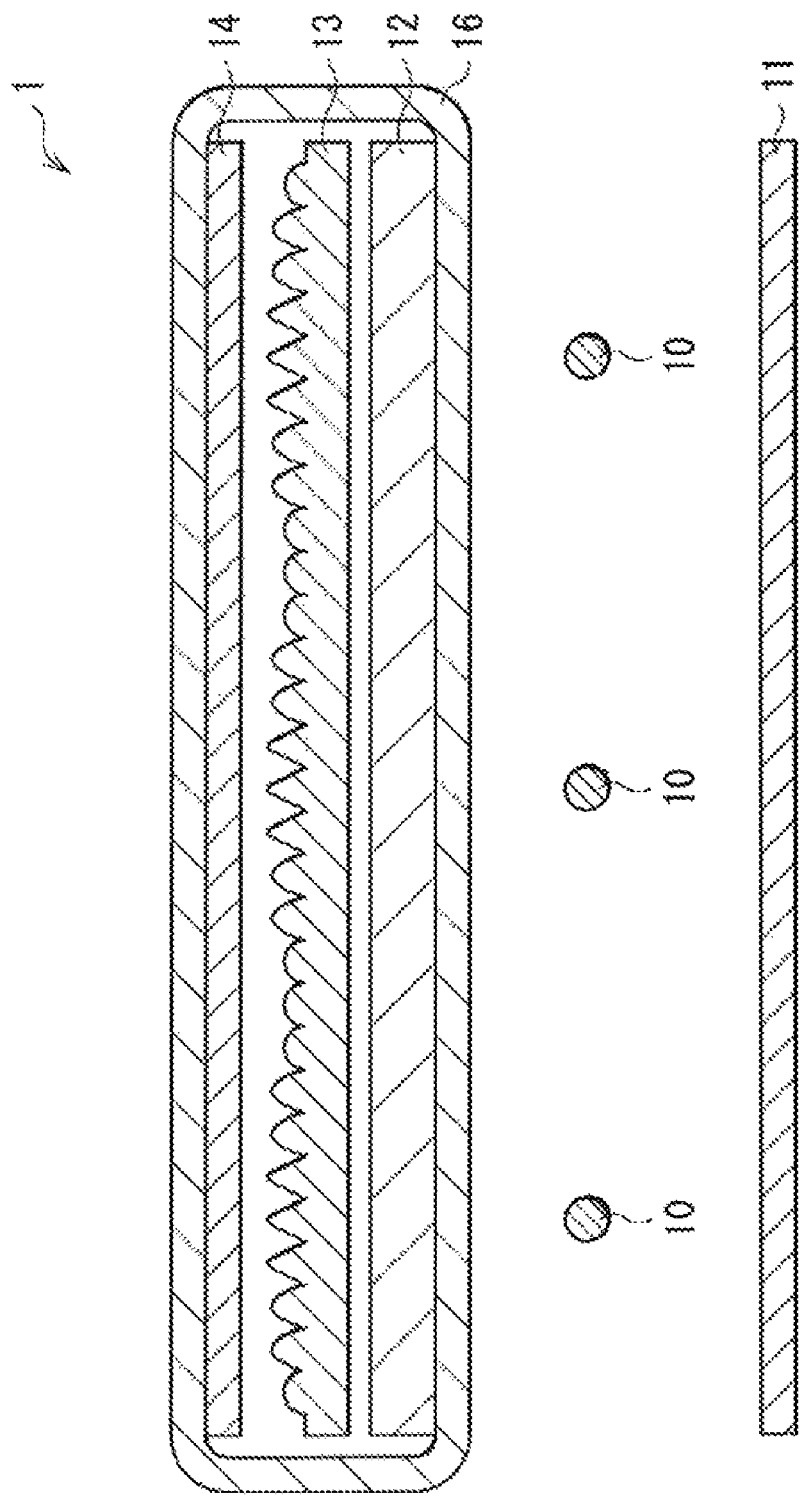
FIG. 21 is a cross sectional structure view of still another modified example of the illuminating device of FIG. 1.
Figure 22:
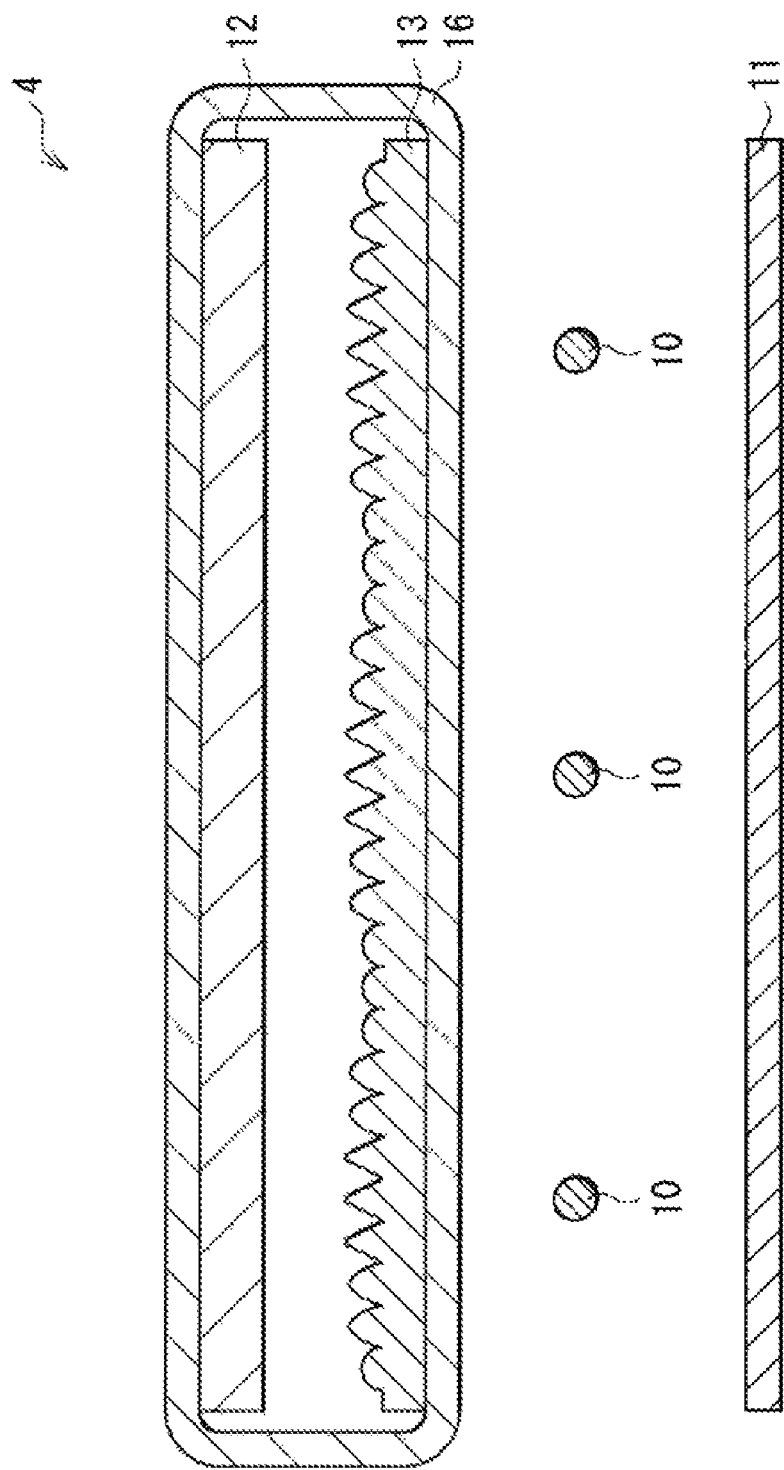
FIG. 22 is a cross sectional structure view of still another modified example of the illuminating device of FIG. 1.
Figure 23:
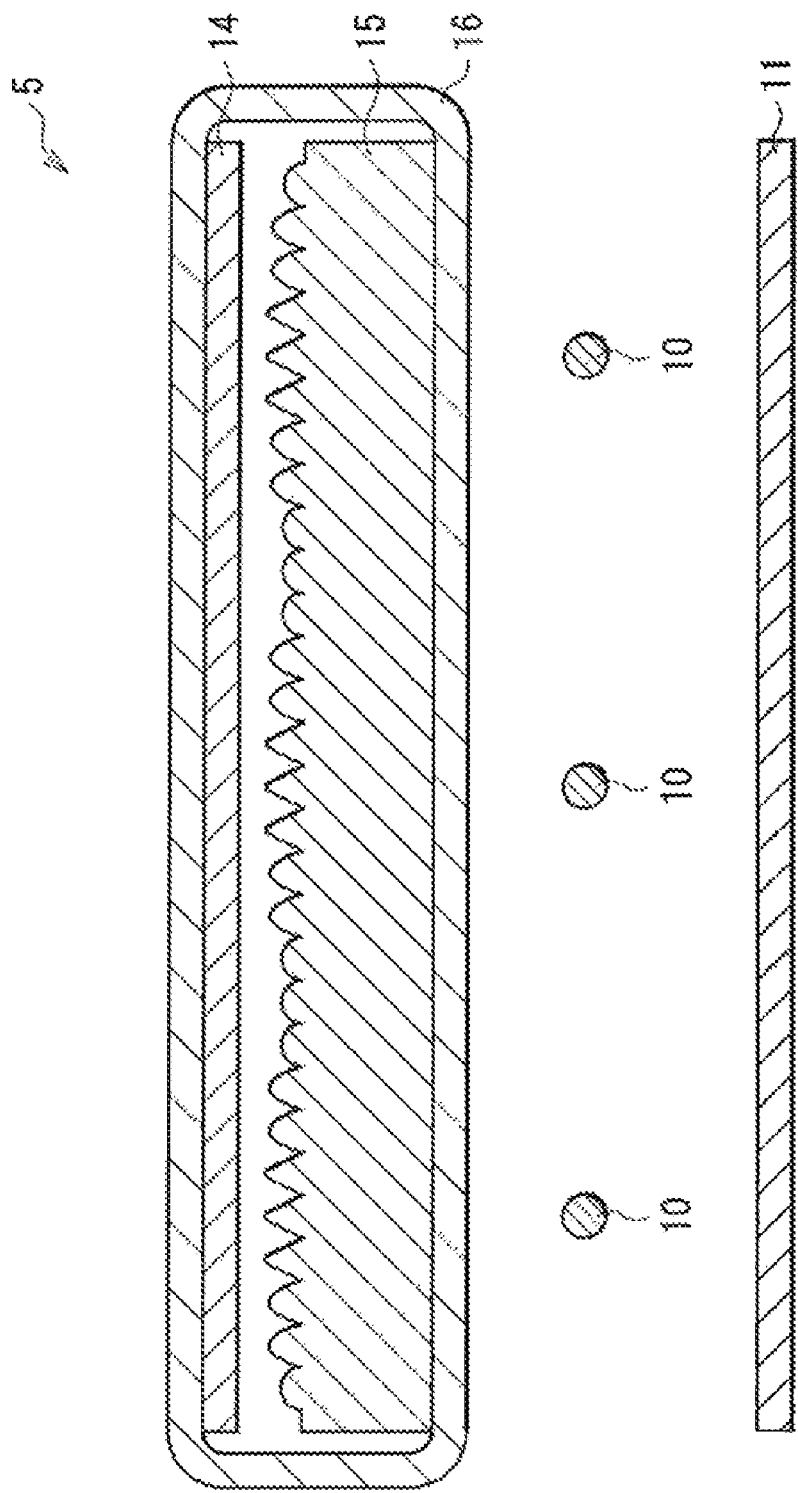
FIG. 23 is a cross sectional structure view of still another modified example of the illuminating device of FIG. 1.
Figure 24:
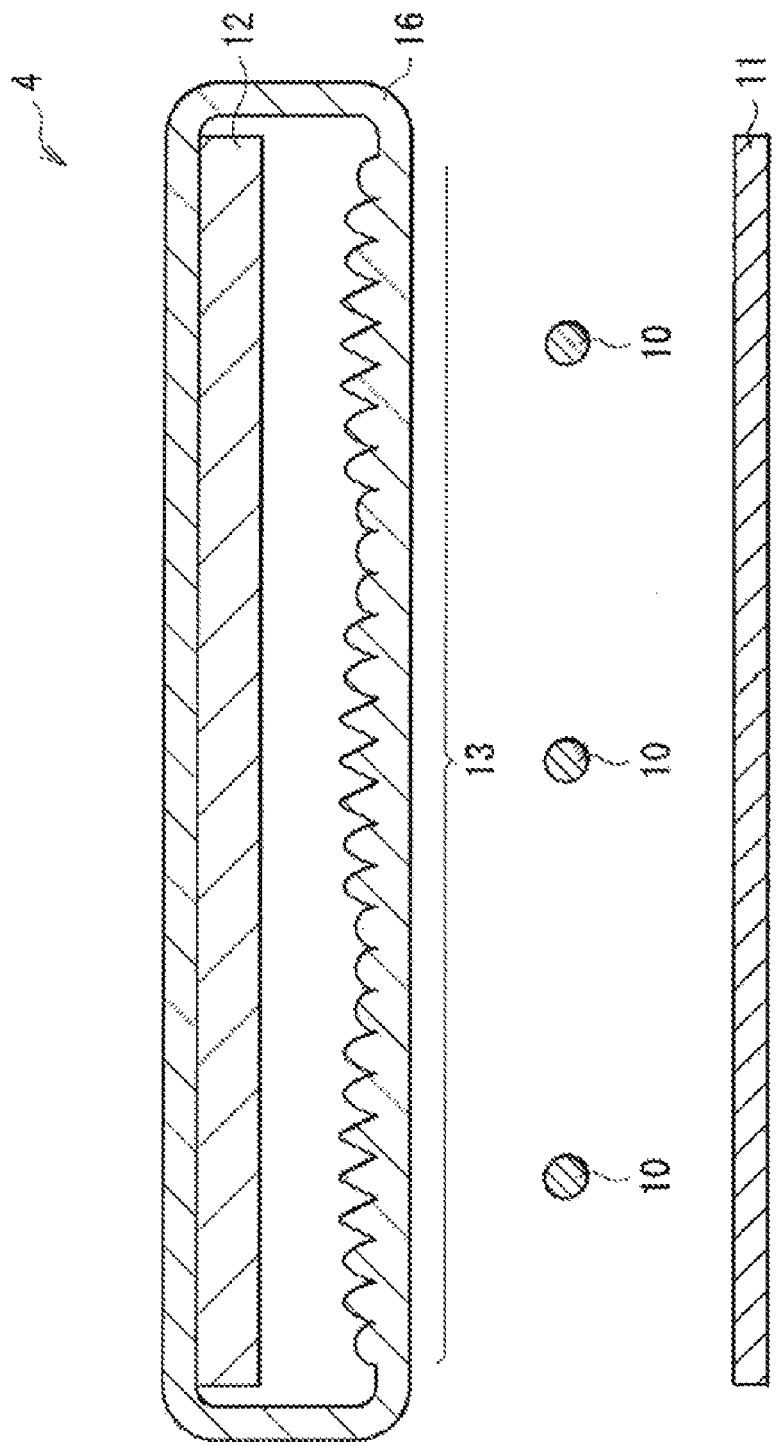
FIG. 24 is a cross sectional structure view of still another modified example of the illuminating device of FIG. 1.

Further, as illustrated in FIGS. 21, 22, and 23, a flexible film 16 wrapping around various optical devices (for example, the diffusion plate 12, the optical sheet 13, the diffusion sheet 14, the optical sheet 15 and the like) arranged above the linear light sources 10 may be provided. In this case, even if the various optical sheets above the linear light sources 10 have a stretching amount changeable according to temperature change different from each other, the various optical devices are able to be supported by a package (not illustrated) of the illuminating devices 1, 4, and 5 without generating a wrinkle in each optical sheet. As illustrated in FIG. 22, in the case where the optical sheet 13 is arranged between the rear face of the diffusion plate 12 (the face on the linear light sources 10 side) and the flexible film 16, it is not necessary to increase the rigidity of the optical sheet 13 in order to prevent warp and deflection. Thus, in this case, the optical sheet 13 is able to be thinned to the same degree as the degree in the case that the optical sheet 13 is provided on the top face of the diffusion plate 12 (case of the foregoing first embodiment). Thereby, even if the optical sheet 13 is provided directly beneath the diffusion plate 12, the illuminating device 4 is able to be thinned. Further, as illustrated in FIG. 24, the flexible film 16 may be provided with convex sections having characteristics similar to those of the convex sections of the optical sheet 13. Thereby, the illuminating device 4 is able to be further thinned. Further, out of the flexible film 16, a light incident region into which light from the linear light sources 10 enters and a light emission region from which light from the linear light sources 10 that has been transmitted through the optical sheet 13 or the like is radiated outside may have a diffusion function and may have a three dimensional shape.

APPLICATION EXAMPLE

Next, a description will be given of a case that the illuminating device 1 of the foregoing embodiment is applied to a display unit. A description will be hereinafter given of an application example of the illuminating device 1. However, it is needless to say that other illuminating devices 4 and 5 may be used instead of the illuminating device 1.

Figure 25:
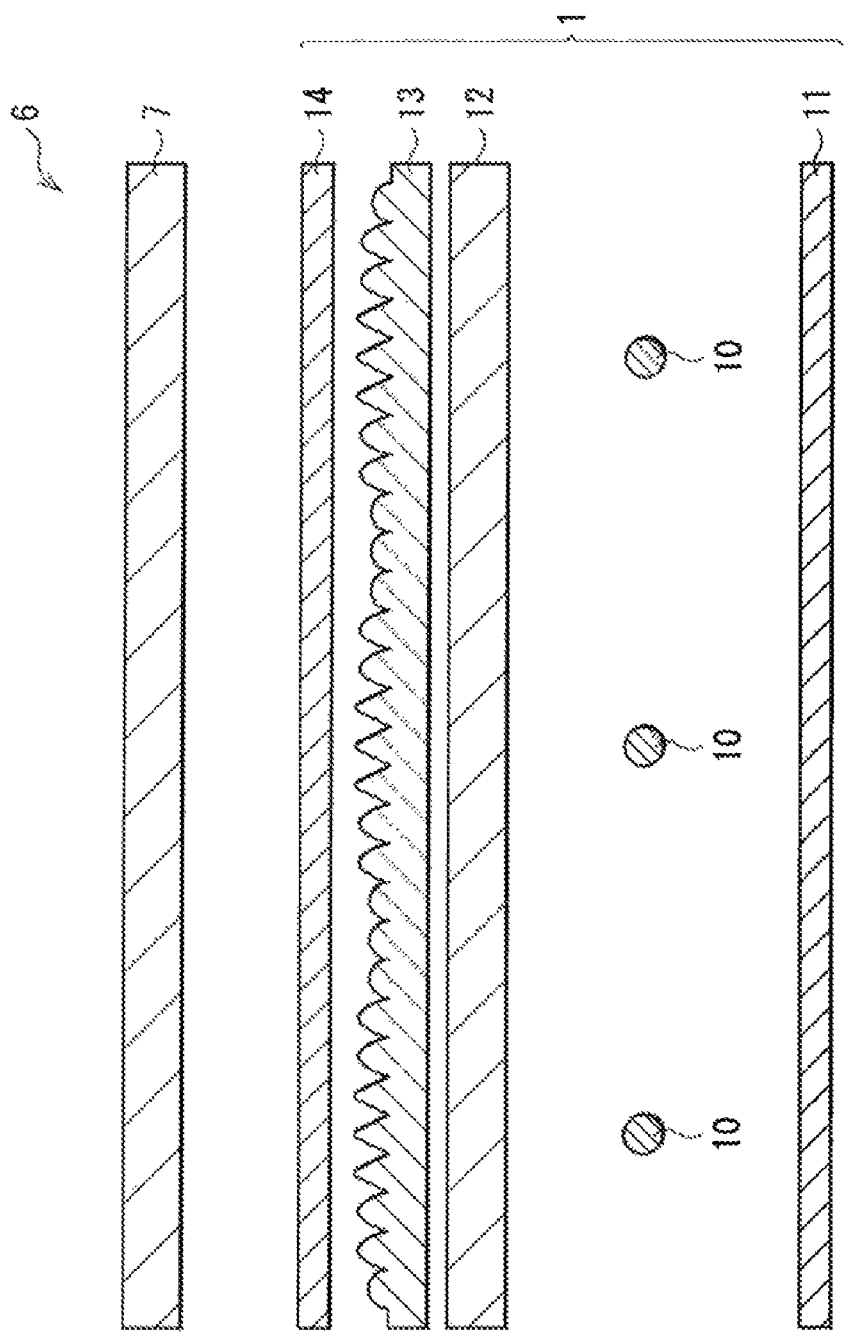
FIG. 25 is a cross sectional structure view of a display unit according to an application example of the illuminating device of FIG. 1.

FIG. 25 illustrates a cross sectional structure of a display unit 6 according to this application example. The display unit 6 includes a display panel 7 and the illuminating device 1 in which the diffusion sheet 14 is oriented to the display panel side behind the display panel 7. The front face of the display panel 7 is oriented to an viewer (not illustrated) side.

Though not illustrated, the display panel 7 has a laminated structure having a liquid crystal layer between a transparent substrate on the viewer side and a transparent substrate on the illuminating device 1 side. Specifically, the display panel 7 has a polarization plate, the transparent substrate, a color filter, a transparent electrode, an oriented film, the liquid crystal layer, an oriented film, a transparent pixel electrode, the transparent substrate, and a polarization plate in the order from the viewer side.

The polarization plate is a kind of an optical shutter, and transmits only light (polarized light) in a certain oscillation direction. These polarization plates are respectively arranged so that each polarizing axis is shifted from each other by 90 degree. Thereby, light radiated from the illuminating device 1 is transmitted through the liquid crystal layer or blocked. The transparent substrate is composed of a substrate transparent to visible light such as a plate glass. In the transparent substrate on the illuminating device 1 side, an active drive circuit including a TFT (Thin Film Transistor) as a drive device electrically connected to the transparent pixel electrode, wiring and the like is formed. In the color filter, for example, color filters for providing color separation into three primary colors of red (R), green (G), and blue (B) for the light radiated from the illuminating device 1 are arranged. The transparent electrode is made of, for example, ITO (Indium Tin Oxide), and functions as a common counter electrode. The oriented film is made of, for example, a polymer material such as polyimide, and provides orientation for the liquid crystal. The liquid crystal layer is made of, for example, a liquid crystal in VA (Vertical Alignment) mode, TN (Twisted Nematic) mode, or STN (Super Twisted Nematic) mode. When a voltage is applied from the drive circuit, the liquid crystal layer transmits or block the light radiated from the illuminating device 1 for every pixel. The transparent pixel electrode is made of, for example, ITO, and functions as an electrode for every pixel.

Next, a description will be given of action in the display unit 6 according to this application example. Light radiated from the respective linear light sources 10 in the illuminating device 1 is adjusted to light having a desired front face luminance, a desired in-plane luminance distribution, a desired view angle and the like. After that, the rear face of the display panel 7 is illuminated with the light. The light that has illuminated the rear face of the display panel 7 is modified by the display panel 7, and is radiated as image light from the front face of the display panel 7 to the viewer side.

In the display unit 6 according to this application example, Formula (1) or Formula (5) is satisfied in the illuminating device 1. Thus, view angle dependability of luminance unevenness of the light illuminating the rear face of the display panel 7 is low. Thereby, even if a viewer see the display unit 6 from a diagonal direction, it is possible that the viewer does not much feel the in-plane luminance unevenness.

While the invention has been described with reference to the embodiment, the modified examples, and the application example, the invention is not limited to the embodiment and the like, and various modifications are able to be made.

For example, in the foregoing embodiment and the like, only the optical device having a diffusion function is arranged on the light emission side of the optical sheets 13 and 15 in the display units 1, 4, and 5. However, an optical device having other function may be arranged. For example, in the case where the optical sheet 13 is arranged directly above the linear light sources 10, a prism sheet is preferably arranged on the light emission side of the optical sheets 13 and 15. Thereby, even if position shift of the optical sheet 13 with respect to the linear light sources 10 is generated, recycle effect that return light in the prism sheet is cycled in the illuminating device 4 is able to relax lowering of the optical characteristics of the display unit 4 resulting from the position shift.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An illuminating device comprising:
a plurality of linear light sources arranged so that respective central axes are in parallel with each other and are included in one plane;
a reflecting plate arranged oppositely to the respective linear light sources;
a diffusion member arranged on a side opposite to the reflecting plate with respect to one face; and
an optical member arranged between the respective linear light sources and the diffusion member,
wherein the optical member has
a light incident surface in parallel with the one face, and
a light emission surface that has a first three dimensional structure in a first region opposed to the respective linear light sources in a normal line direction of the one face and a second three dimensional structure in a second region opposed to an intermediate region between one linear light source and another linear light source adjacent to the one linear light source in the normal line direction of the one face, and
wherein where an occupancy ratio of a first section in which light from the respective linear light sources vertically entering the light incident surface is entirely reflected by the first three dimensional structure and return light oriented toward the reflecting plate is generated out of the first region when the optical member is viewed from the normal line direction of the one face is $K1$; and where an occupancy ratio of a second section in which light from the respective linear light sources vertically entering the light incident surface is entirely reflected by the second three dimensional structure and return light oriented toward the reflecting plate is generated out of the second region when the optical member is viewed from the normal line direction of the one face is $K2$,
$K1$ and $K2$ satisfy the following formula, $$K1-K2>0.$$

2. The illuminating device according to claim 1, wherein where an angle made by a tangential line contacted with the first three dimensional structure and the one face is $\Phi1$, and an angle made by a tangential line contacted with the second three dimensional structure and the one face is $\Phi2$, $\Phi1$ and $\Phi2$ satisfy the following formulas in the first section and the second section, $$39 \leq \Phi1 \leq 69$$

$$39 \leq \Phi1 \leq 69.$$

3. The illuminating device according to claim 1, wherein $K1$ and $K2$ satisfy the following formula, $$K1-K2 \geq 0.03.$$

4. The illuminating device according to claim 1, wherein $K1$ and $K2$ satisfy the following formula, $$K1-K2 \geq 0.06.$$

5. The illuminating device according to claim 1, wherein K1 and K2 satisfy the following formula, $K1-K2 \geqq 0.12$.

6. The illuminating device according to claim 1, wherein K1 and K2 satisfy the following formula, $K1-K2 \geqq 0.15$.

7. The illuminating device according to claim 1, wherein K1 and K2 satisfy the following formula, $K1-K2 \geqq 0.18$.

8. The illuminating device according to claim 1, wherein K2 is zero.

9. The illuminating device according to claim 1, wherein a distance between the linear light sources is 30 mm or more.

10. The illuminating device according to claim 1, wherein the first three dimensional structure has a linear plurality of first convex sections, and the second three dimensional structure has a linear or petrosal plurality of second convex sections.

11. The illuminating device according to claim 1, wherein an angle made by a tangential line contacted with the first convex section and the one face is Φ1, and an angle made by a tangential line contacted with the second convex section and the one face is Φ2, Φ1 and Φ2 become continuously or intermittently larger as the position of Φ1 and Φ2 is shifted from the apex section of the convex sections to the bottom section of the convex sections.

12. The illuminating device according to claim 10, wherein the first convex section and the second convex section have a tilted flat face.

13. The illuminating device according to claim 10, wherein the first convex section and the second convex section have an aspheric surface.

14. The illuminating device according to claim 10, wherein the first convex section has a tilted flat face and the second convex section has an aspheric surface.

15. The illuminating device according to claim 10, wherein the first convex section and the second convex section have a convex-like curved face in an apex section and in the vicinity thereof, and a tilted flat face smoothly continuous with the curved face in the other sections.

16. The illuminating device according to claim 15, wherein a curvature of the curved face of the first convex section is smaller than a curvature of the curved face of the second convex section.

17. The illuminating device according to claim 10, wherein a height of the first convex section is higher than a height of the second convex section.

18. The illuminating device according to claim 10, wherein the first three dimensional structure and the second three dimensional structure have one or a plurality of flat faces in parallel with the one face, and
wherein the occupancy ratio of the flat face of the first three dimensional structure out of the first region when the optical member is viewed from the normal line direction of the one face is K3, and the occupancy ratio of the flat face of the second three dimensional structure out of the second region when the optical member is viewed from the normal line direction of the one face is K4, K3 and K4 satisfy the following formula, $K4-K3 > 0$.

19. The illuminating device according to claim 18, wherein the flat face is formed in a region where the first convex section and the second convex section are not formed.

20. The illuminating device according to claim 19, wherein the flat face is also formed in an apex section of the second convex section.

21. The illuminating device according to claim 1, wherein the diffusion member is a diffusion plate.

22. The illuminating device according to claim 1, wherein a diffusion plate is included between the optical member and the respective linear light sources.

23. The illuminating device according to claim 22, wherein the diffusion member is a diffusion sheet.

24. The illuminating device according to claim 1, wherein the diffusion member and the optical member are integrally formed.

25. The illuminating device according to claim 1, wherein a flexible film that wraps around the diffusion member and the optical member is included.

26. The illuminating device according to claim 25, wherein the flexible film has a diffusion function in a light incident region into which light from the linear light sources enters.

27. The illuminating device according to claim 25, wherein the flexible film has a three dimensional shape on a surface of a light incident region into which light from the linear light sources enters.

28. A display unit comprising:
a panel driven based on an image signal; and
an illuminating device illuminating the panel, wherein the illuminating device includes
a plurality of linear light sources arranged so that respective central axes are in parallel with each other and are included in one plane,
a reflecting plate arranged oppositely to the respective linear light sources,
a diffusion member arranged on a side opposite to the reflecting plate with respect to one face, and
an optical member arranged between the respective linear light sources and the diffusion member,
wherein the optical member has
a light incident surface in parallel with the one face, and
a light emission surface that has a first three dimensional structure in a first region opposed to the respective linear light sources in a normal line direction of the one face and a second three dimensional structure in a second region opposed to an intermediate region between one linear light source and another linear light source adjacent to the one linear light source in the normal line direction of the one face, and
wherein where an occupancy ratio of a first section in which light from the respective linear light sources vertically entering the light incident surface is entirely reflected by the first three dimensional structure and return light oriented toward the reflecting plate is generated out of the first region when the optical member is viewed from the normal line direction of the one face is K1; and where an occupancy ratio of a second section in which light from the respective linear light sources vertically entering the light incident surface is entirely reflected by the second three dimensional structure and return light oriented toward the reflecting plate is generated out of the second region when the optical member is viewed from the normal line direction of the one face is K2,
K1 and K2 satisfy the following formula, $K1-K2 > 0$.

* * * * *